(12) United States Patent
Furumi

(10) Patent No.: US 11,822,783 B2
(45) Date of Patent: Nov. 21, 2023

(54) DISPLAY APPARATUS, DISPLAY METHOD, AND INFORMATION SHARING SYSTEM

(71) Applicant: Yui Furumi, Tokyo (JP)

(72) Inventor: Yui Furumi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/122,716

(22) Filed: Mar. 17, 2023

(65) Prior Publication Data

US 2023/0305696 A1  Sep. 28, 2023

(30) Foreign Application Priority Data

Mar. 23, 2022 (JP) ................................. 2022-046678

(51) Int. Cl.
| | |
|---|---|
| G06F 3/04883 | (2022.01) |
| G06F 3/14 | (2006.01) |
| G06F 3/0481 | (2022.01) |
| G06F 40/171 | (2020.01) |
| G06F 40/177 | (2020.01) |

(52) U.S. Cl.
CPC ........ *G06F 3/04883* (2013.01); *G06F 3/0481* (2013.01); *G06F 3/1454* (2013.01); *G06F 40/171* (2020.01); *G06F 40/177* (2020.01)

(58) Field of Classification Search
CPC ... G06F 3/04883; G06F 3/0481; G06F 3/1454
See application file for complete search history.

(56) References Cited

U.S. PATENT DOCUMENTS

| | | |
|---|---|---|
| 8,572,474 B1 | 10/2013 | Mukherjee et al. |
| 10,755,029 B1 | 8/2020 | de la Fuente et al. |
| 2007/0011606 A1 | 1/2007 | Bagheri |
| 2009/0161958 A1* | 6/2009 | Markiewicz ......... G06V 30/387 345/179 |
| 2015/0193141 A1 | 7/2015 | Goldsmith et al. |
| 2015/0293690 A1* | 10/2015 | Chang ................. G06F 3/04883 715/268 |
| 2016/0179758 A1 | 6/2016 | Perrin et al. |
| 2016/0349980 A1 | 12/2016 | Chiang et al. |
| 2018/0039401 A1* | 2/2018 | Freville ................. G06F 40/166 |
| 2022/0129085 A1* | 4/2022 | Igarashi ............. G06F 3/04817 |
| 2022/0291828 A1* | 9/2022 | Minagawa .......... G06F 3/04886 |

FOREIGN PATENT DOCUMENTS

JP  2016-177529  10/2016

OTHER PUBLICATIONS

EESR dated Sep. 6, 2023, in corresponding European Application No. 23162183.0, 7pp.

* cited by examiner

*Primary Examiner* — Mong-Shune Chung
(74) *Attorney, Agent, or Firm* — XSENSUS LLP

(57) ABSTRACT

A display apparatus includes circuitry to receive an input of hand drafted input data. The hand drafted input data is input to an input area being displayed. The circuitry displays, in the input area, an object corresponding to the hand drafted input data, and displays, based on a part of the object failing to be displayed within the input area, a display component related to an additional object representing at least the part of the object.

17 Claims, 32 Drawing Sheets

FIG. 5
| | |
|---|---|
| INPUT AREA ID | 001 |
| COORDINATES | (x, y) |
| SIZE | 5 cm × 20 cm |
| FONT | MS P GOTHIC |
| FONT SIZE | 4 cm |
| FONT COLOR | BLACK |
| FONT ALIGNMENT | CENTER/CENTER |
| MARGIN OF INPUT AREA | SMALL |
| DICTIONARY | DICTIONARY A, DISPLAY OPERATION GUIDE |
| THE MAXIMUM NUMBER OF CHARACTERS THAT CAN BE DISPLAYED | 12 |
| INPUT TEXT | REQUEST FOR WATER AND FOOD |
| DEGREE OF IMPORTANCE | HIGH |
FIG. 6A
FIG. 6B

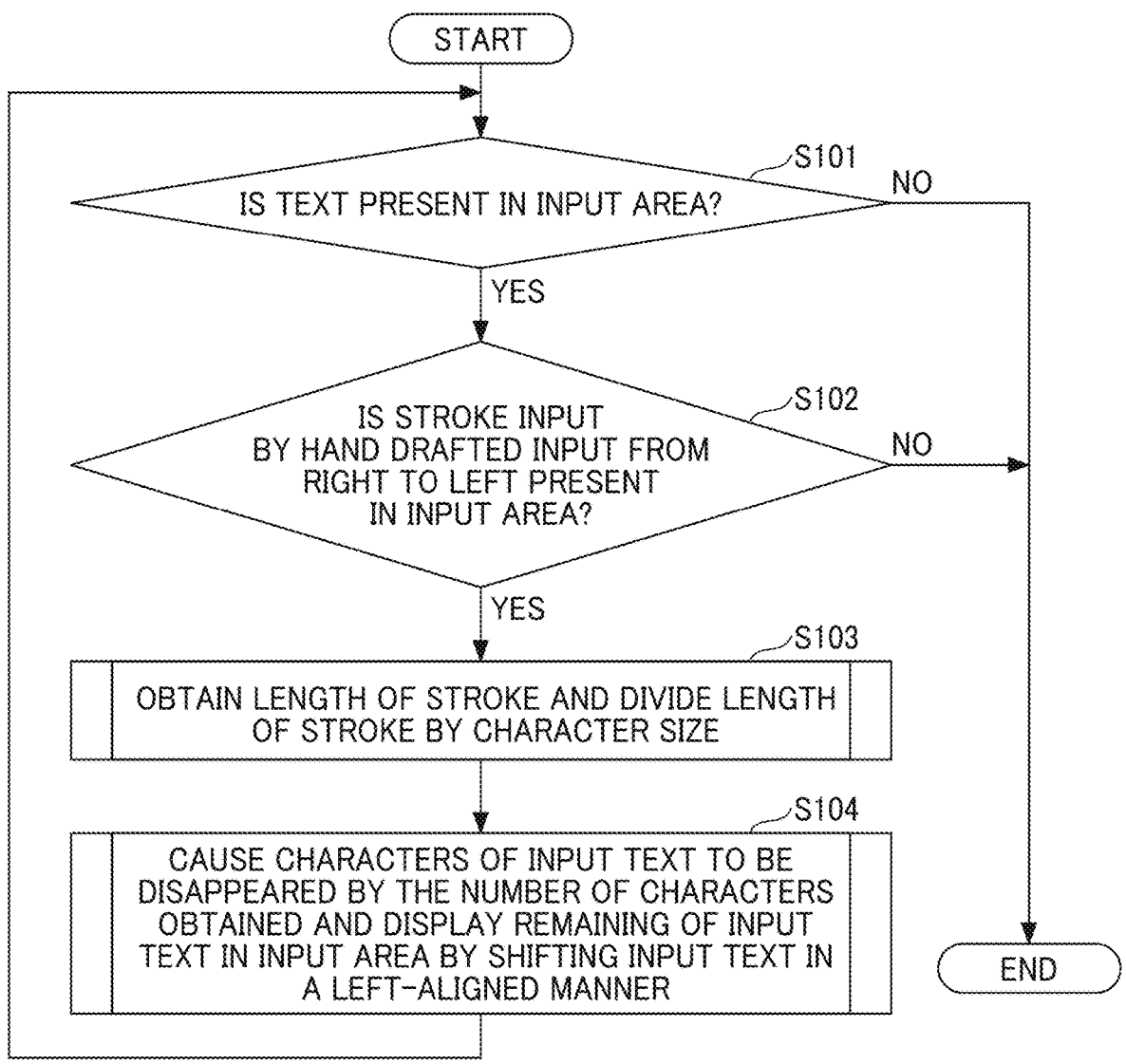

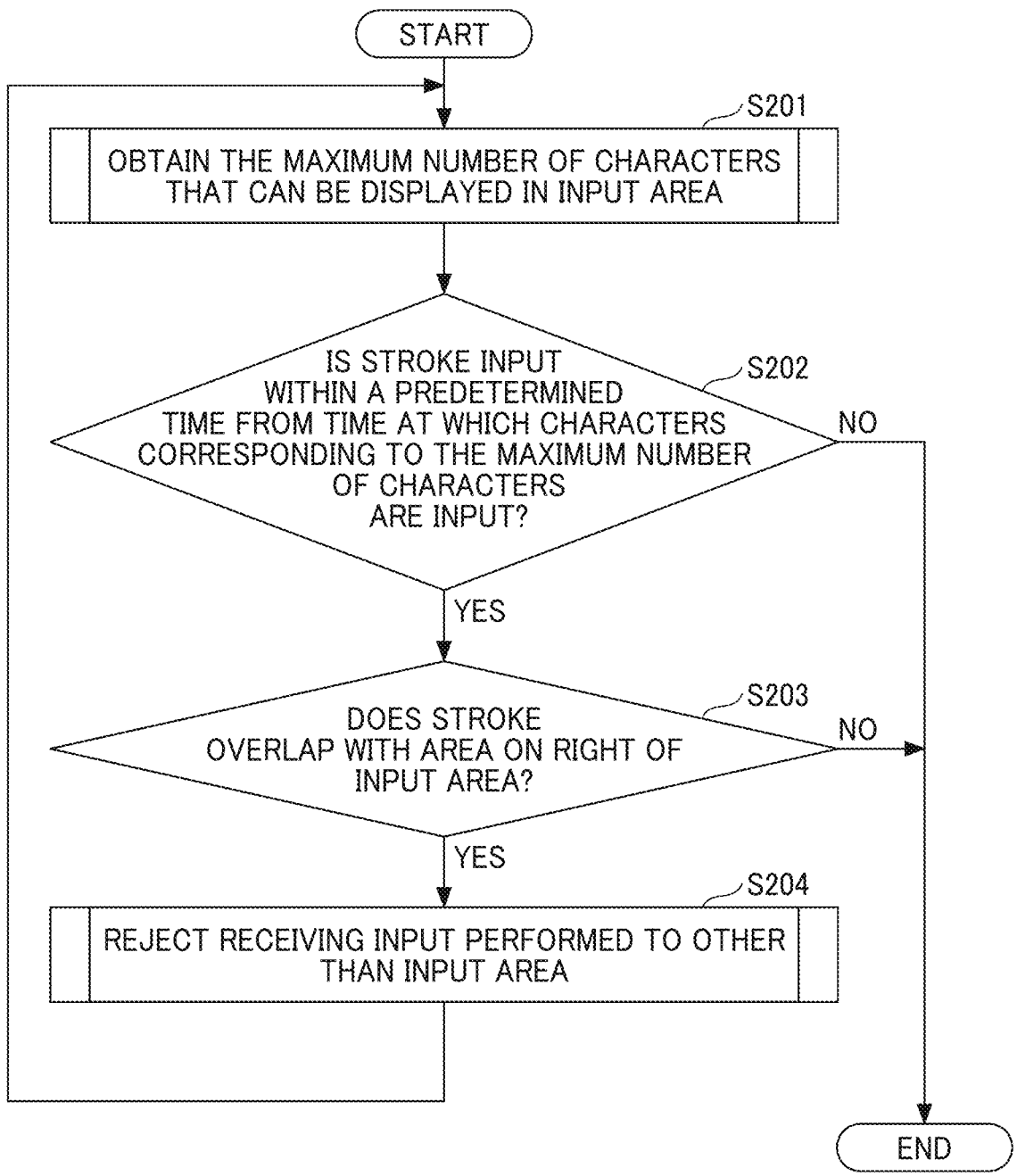

FIG. 24

| TIME | INFORMATION SOURCE | INFORMATION DESTINATION | DETAILS | TIME | INFORMATION SOURCE | INFORMATION DESTINATION | DETAILS |
|---|---|---|---|---|---|---|---|
| 10:47 | HEAD OFFICE | | DMAT will arrive | 12:02 | HEAD OFFICE | | request for energy for DMAT vehicle |
| 10:55 | JAPAN SDF | | request for cooperation with medical team | 12:13 | YYY UNIVERSITY | | request for adding registered nurses |
| 10:58 | XXXXXXX DMAT | CITY HALL | medical needs at BB school are reported | 12:17 | FIRE TEAM | | a house is collapsed |
| | | | request for a list of shelters | 12:35 | Z JUNIOR SCHOOL | | lack of kerosene for stoves |
| 11:15 | FIRE TEAM | | fire fighting in city | 12:50 | | SHOP | supplies (toilet paper 2000, masks 2000, bottles of disinfectant 200) |
| 11:17 | MEDICAL CENTER | | inquiry whether city can supply medicines | 13:05 | HEAD OFFICE | | assistance members 50 will arrive |

FIG. 25

RELATED ART

| TIME | INFORMATION SOURCE | INFORMATION DESTINATION | DETAILS | | TIME | INFORMATION SOURCE | INFORMATION DESTINATION | DETAILS |
|---|---|---|---|---|---|---|---|---|
| 10:47 | HEAD OFFICE | | DMAT will arrive | | 12:02 | HEAD OFFICE | | request for energy for DMAT vehicle |
| 10:55 | JAPAN SDF | | request for cooperation with | | 12:13 | YYY UNIVER | | request for adding registered nurses |
| 10:58 | XXXXXX DM | | medical needs at BB school are | | 12:17 | FIRE TEAM | | a house is collapsed |
| | | CITY HALL | request for a list of shelters | | 12:35 | Z JUNIOR S | SHOP | lack of kerosene for stoves |
| 11:15 | FIRE TEAM | | fire fighting in city | | 12:50 | | | supplies (toilet paper 2000, masks |
| 11:17 | MEDICAL CE | | inquiry whether city can supply | | 13:05 | HEAD OFFICE | | assistance members 50 will arrive |

FIG. 26

| TIME | INFORMATION SOURCE | INFORMATION DESTINATION | DETAILS | TIME | INFORMATION SOURCE | INFORMATION DESTINATION | DETAILS |
|---|---|---|---|---|---|---|---|
| 10:47 | HEAD OFFICE | | DMAT will medical team | 12:02 | HEAD OFFICE | | request for energy for DMAT vehicle |
| 10:55 | JAPAN SDF | | request for cooperation with | 12:13 | YYY UNIVERSITY | | request for adding registered nurses |
| 10:58 | XXXXXX DMAT | CITY HALL | medical needs at BB school are reported | 12:17 | FIRE TEAM | | a house is collapsed |
| 11:15 | FIRE TEAM | | request for a list of shelters | 12:35 | Z JUNIOR S | | lack of kerosene for stoves |
| 11:17 | MEDICAL CENTER | | fire fighting in city | 12:50 | | SHOP | supplies (toilet paper 2000, mask |
| | | | inquiry whether city can su | 13:05 | HEAD OFFICE | | assistance members 50 will arrive |

| PATIENTS IN RED ZONE | | | | | TIMESTAMP | | CURRENT NUMBER | |
|---|---|---|---|---|---|---|---|---|
| No. | AGE | GEN-DER | NAME | DISEASE/INJURY | TREAT-MENT/SITUATION | SECOND-ARY TRIAGE | OUT-COME | CORRESPON-DENCE FROM HEAD OFFICE |
| 1 | 30 | MALE | TOKYO TARO | INTESTINAL PROLAPSE | REQUIRED OPERATION EMERGENTLY | | | TRANSPORT TO OPERA-TION ROOM 1 |

2500

⇅ REMOTELY SHARING (b)

354B

| PATIENTS IN RED ZONE | | | | | TIMESTAMP | | CURRENT NUMBER | |
|---|---|---|---|---|---|---|---|---|
| No. | AGE | GEN-DER | NAME | DISEASE/INJURY | TREAT-MENT/SITUATION | SECOND-ARY TRIAGE | OUT-COME | CORRESPON-DENCE FROM HEAD OFFICE |
| 1 | 30 | MALE | TOKYO TARO | INTESTINAL PROLAPSE | REQUIRED OPERATION EMERGENTLY | | | TRANSPORT TO OPERA-TION ROOM 1 |

ENTER INFORMATION FROM HEADQUARTERS

LOCATION A 361(360)

PATIENTS IN RED ZONE · TIMESTAMP · CURRENT NUMBER

| No. | AGE | GEN-DER | NAME | DISEASE/INJURY | TREAT-MENT/SITUATION | SECOND-ARY TRIAGE | OUT-COME | CORRESPON-DENCE FROM |
|---|---|---|---|---|---|---|---|---|
| 1 | 30 | MALE | TOKYO TARO | INTESTINAL PROLAPSE | REQUIRED OPERATION EMERGENTLY | 371 | | |

ENLARGE

REQUIRED OPERATION EMERGENTLY

EDIT FRAME

301

372

LOCATION C 363

PATIENTS IN RED ZONE · TIMESTAMP · CURRENT NUMBER

| No. | AGE | GEN-DER | NAME | DISEASE/INJURY | TREAT-MENT/SITUATION | SECOND-ARY TRIAGE | OUT-COME | CORRESPON-DENCE FROM HEAD OFFICE |
|---|---|---|---|---|---|---|---|---|
| 1 | 30 | MALE | TOKYO TARO | INTESTINAL PROLAPSE | REQUIRED OPERATION EMERGENTLY | | | TRANSPORT TO OPERA-TION ROOM 1 |

LOCATION B 362

PATIENTS IN RED ZONE    TIMESTAMP    CURRENT NUMBER

| No. | AGE | GENDER | NAME | DISEASE/ INJURY | TREATMENT/ SITUATION | SECONDARY TRIAGE | OUTCOME | CORRESPONDENCE FROM HEAD OFFICE |
|---|---|---|---|---|---|---|---|---|
| 1 | 30 | MALE | TOKYO TARO | INTESTINAL PROLAPSE | REQUIRED OPERATION EMERGENTLY | | | TRANSPORT TO OPERATION ROOM 1 |
| | | | | | | | | |
| | | | | | | | | |
| | | | | | | | | |
| | | | | | | | | |
| | | | | | | | | |
| | | | | | | | | |

LOCATION D 364

PATIENTS IN RED ZONE    TIMESTAMP    CURRENT NUMBER

| No. | AGE | GENDER | NAME | DISEASE/ INJURY | TREATMENT/ SITUATION | SECONDARY TRIAGE | OUTCOME | CORRESPONDENCE FROM HEAD OFFICE |
|---|---|---|---|---|---|---|---|---|
| 1 | 30 | MALE | TOKYO TARO | INTESTINAL PROLAPSE | REQUIRED OPERATION EMERGENTLY | | | TRANSPORT TO OPERATION ROOM 1 |
| | | | | | | | | |
| | | | | | | | | |
| | | | | | | | | |
| | | | | | | | | |
| | | | | | | | | |
| | | | | | | | | |

DISPLAY APPARATUS, DISPLAY METHOD, AND INFORMATION SHARING SYSTEM

CROSS-REFERENCE TO RELATED APPLICATIONS

This patent application is based on and claims priority pursuant to 35 U.S.C. § 119(a) to Japanese Patent Application No. 2022-046678, filed on Mar. 23, 2022, in the Japan Patent Office, the entire disclosure of which is hereby incorporated by reference herein.

BACKGROUND

Technical Field

Embodiments of the disclosure relate to a display apparatus, a display method, a program, and an information sharing system.

Related Art

Known display apparatuses convert handwriting data or hand drafted input data into text and display the text on a display by using a handwriting recognition technique. Such a display apparatus having a relatively large touch panel is used as, for example, an electronic whiteboard by a plurality of users in a conference room or a public facility. The display apparatus can also display information input by hand drafted input in a table format.

A technique for reducing a size of hand drafted input data is known. A known technique for facilitating hand drafted input of a character having a large number of strokes reduces a size of hand drafted input data input to a hand drafted input area that is limited not to expanded.

SUMMARY

An embodiment of the disclosure includes a display apparatus including circuitry to receive an input of hand drafted input data. The hand drafted input data is input to an input area being displayed. The circuitry displays, in the input area, an object corresponding to the hand drafted input data, and displays, based on a part of the object failing to be displayed within the input area, a display component related to an additional object representing at least the part of the object.

An embodiment of the disclosure includes a display method including receiving an input of hand drafted input data. The hand drafted input data is input to an input area being displayed. The display method includes displaying, in the input area, an object corresponding to the hand drafted input data, and displaying, based on a part of the object failing to be displayed within the input area, a display component in which at least the part of the object is displayed.

An embodiment of the disclosure includes an information sharing system. The information sharing system includes a first display apparatus including first circuitry, and a second display apparatus including second circuitry. The second display apparatus is connected to the first display apparatus via a network to communicate and to share information with the first display apparatus. Each of the first circuitry and the second circuitry receives an input of hand drafted input data. The hand drafted input data is input to an input area displayed on a corresponding one of a first display of the first display apparatus and a second display of the second display apparatus. Each of the first circuitry and the second circuitry displays, on the corresponding one of the first display and the second display, an object corresponding to the hand drafted input data in the input area. In a case that a part of the object fails to be displayed within the input area, a corresponding one of the first circuitry and the second circuitry displays, on the corresponding one of the first display and the second display, a display component in which an additional object representing at least the part of the object is displayed. In a case that the first circuitry displays the additional object in the display component on the first display, the second circuitry displays, on the second display, the additional object in the display component, in response to receiving an indication that the first circuitry displays the additional object in the display component on the first display. The indication is received from the first display apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a diagram illustrating an example of input area information stored in an input area information storage unit according to the first embodiment of the disclosure:

FIGS. 6A and 6B are diagrams each illustrating an example of an input text input to an input area, according to the first embodiment of the disclosure;

FIG. 16 is a flowchart illustrating an example of a process performed by the display apparatus for generating a blank space when the blank space of the input area is running out, as described with reference to FIG. 15 (FIGS. 15A to 15C), according to the first embodiment of the disclosure;

FIG. 19 is a flowchart illustrating an example of a process performed by the display apparatus for receiving a hand drafted input of one or more strokes to a right input area illustrated in FIGS. 18A and 18B, according to the first embodiment of the disclosure;

FIG. 24 is a diagram illustrating an example of a chronology that is generated by hand drafted input, according to a second embodiment of the disclosure;

FIG. 25 is a diagram illustrating an example of a chronology that is displayed, according to a related art;

FIG. 26 is a diagram illustrating an example of display of a chronology to which pop-up display is applied, according to the second embodiment of the disclosure;

FIG. 28 is a diagram illustrating an example of a triage table displayed by the display apparatus according to the third embodiment of the disclosure;

Figure 1A:
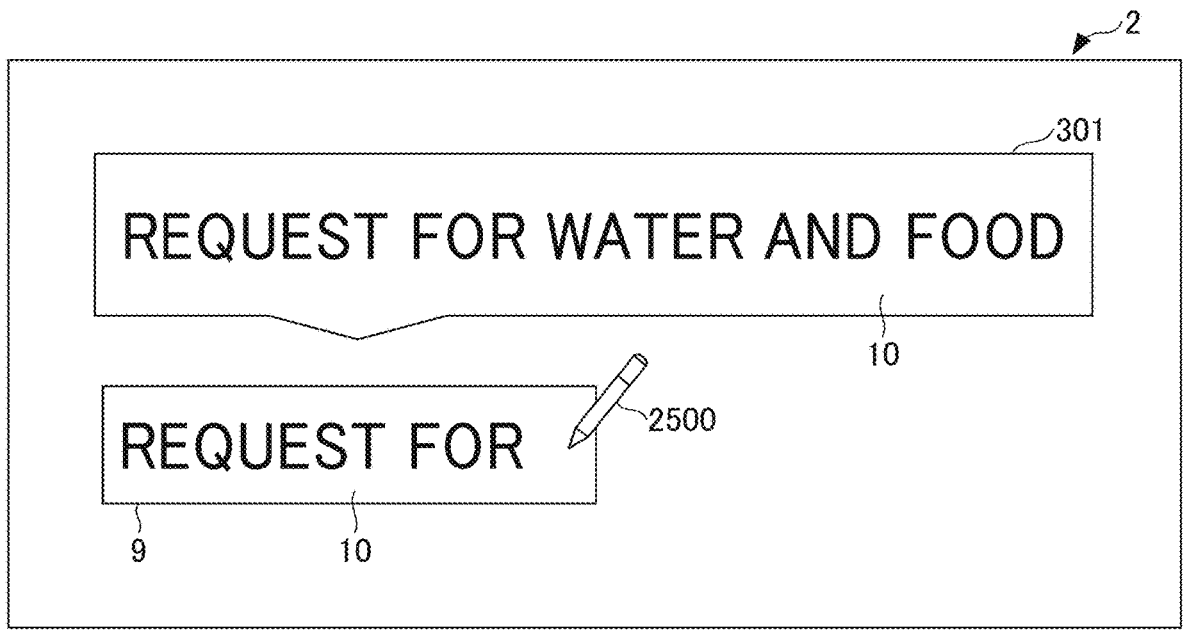
FIGS. 1A and 1B are diagrams each illustrating an example of a display component related to an input text having characters of which the number if greater than the maximum number of characters that can be displayed, according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A display apparatus and a display method performed by the display apparatus according to one or more embodiments of the present disclosure are described with reference to the attached drawings.

First Embodiment

Displaying Display Component Related to Input Text Having Characters of which Number is Greater than Maximum Number of Characters that can be Displayed When the number of characters of an input text is greater than the number of characters that can be displayed (in the following, referred to as the maximum number of characters that can be displayed) in an input area, a display apparatus according to a first embodiment displays the input text in a pop-up manner during the text is being input. In a case that a language input as text is English, a space between words is also counted as one character, with respect to the maximum number of characters that can be displayed and the number of characters of the text. The overview of the present embodiment is described below.

In a related art, handwritten content, or hand drafted input content, is reduced and displayed according to a user operation performed on a reduction button, and this takes time and efforts for a user. When inputting stroke data, or hand drafted input data, corresponding to such as text by handwriting input, or hand drafted input, the user may desire to check or confirm whether the stroke data, or hand drafted input data, is displayed as the user intended, more specifically, whether the stroke data, or hand drafted input data, has been converted in a manner that the user intended or whether the stroke data has been turned to a part of the hand drafted input data in a manner that the user intended. However, in such a related art, the handwritten content or hand drafted input content is reduced and displayed according to a user operation performed on a reduction button, which is an instruction from a user, and this takes time and efforts of the user. In addition, converted text being reduced is hard to be viewed, and the user have difficulty to confirm whether the converted text is obtained by intended conversion or based on intended hand drafted input data. In addition, there is a case that not all of the converted text or not all of the hand drafted input data may be displayed within the input area, and the user may have difficulty to confirm the text or the hand drafted input data.

FIG. 1A is a diagram illustrating an example of display including an input text 10 input to an input area 9 and a pop-up 301 displayed in association with the input area 9. The maximum number of characters that can be displayed within an input area 9 and the input text 10 are as follows.

The maximum number of characters that can be displayed: 12

Input text: REQUEST FOR WATER AND FOOD

Because the number of characters of the input text 10 is greater than the maximum number of characters that can be displayed, a part of the input text 10 of "REQUEST FOR" is displayed in the input area 9. A display apparatus 2 according to the present embodiment displays the pop-up 301 including the input text 10 in the proximity of the input area 9, in response to the input of the input text 10 that has the number of characters being greater than the maximum number of characters that can be displayed. This allows the user to check and confirm the input text 10 that does not fit in the input area 9.

In the following description of embodiments, to display a pop-up, such as the pop-up 301, may be simply referred to as "pop-up display" or to "display in a pop-up manner." In addition, in the following description, an event that the number of characters of the input text 10 is greater than the maximum number of characters that can be displayed may be expressed that the input text 10 does not fit in an input area and not all of the input text 10 is displayed within, or in, the input area. Such an event may be expressed that the input text 10 does not fit in an input area and a part of the input text 10 is not displayed within, or in, the input area. Such an event may be simply expressed that the input text 10 does not fit in the input area, that not all of the input text 10 is displayed, or that a part of the input text 10 is not displayed.

When the number of characters of the input text 10 is greater than the maximum number of characters that can be displayed, the display apparatus 2 according to the present embodiment can display a mark 302 in or in the proximity of the input area 9, in response to the input of the input text 10 having the number of characters greater than the maximum number of characters that can be displayed.

Figure 1B:

FIG. 1B is a diagram illustrating an example of display in which a mark 302 is displayed in the input area 9. The input text 10 is the same as that of FIG. 1A. When the input text 10 does not fit in the input area 9, and a part of the input text 10 is not displayed in the input area 9, the display apparatus 2 displays the mark 302 in the input area 9. Although details of a display method of the mark 302 are described later, in FIG. 1B, the mark 302 in a balloon shape is displayed at the lower right of the input area 9.

The mark 302 allows the user to know, or notice, that a part of the input text 10 is not displayed in the input area 9. When the user presses the mark 302 with a pen 2500, the display apparatus 2 displays all of the input text 10 in a pop-up manner as illustrated in FIG. 1A.

As described above, the display apparatus 2 according to the present embodiment displays the display components (the pop-up 301 and the mark 302) in relation to the input text 10 of which a part is not displayed in the input area 9. Accordingly, even when the input text 10 that does not fit in the input area 9 is present, the user can see all of the input text 10, and this can reduce user's misunderstanding or mistakenly recognizing. Since the display apparatus 2 can display the pop-up 301 during the input of text, the user can continuously input the text while checking the input text 10.

Terms

"Input device" refers to any devices with which a user hand drafted input can be performed by designating coordinates on a touch panel. Examples of the input device include, but are not limited to, a pen, a human finger, a human hand, and a bar-shaped member.

A series of user operations including engaging a writing mode, recording movement of an input device or portion of a user, and then disengaging the writing mode is referred to as a stroke. A stroke includes tracking movement of the portion of the user without contacting a display or screen. In this case, the writing mode may be engaged or turned on by a gesture of a user, pressing a button by a hand or a foot of the user, or otherwise turning on the writing mode, for example using a pointing device such as a mouse. The engaging of the writing mode may include, if desired, pressing an input device against a display or screen, and disengaging the writing mode may include releasing the input device from the display or screen. The disengaging of the writing mode can be accomplished by the same or different gesture used to engage the writing mode, releasing the button, or otherwise turning off the writing mode, for example using the pointing device or mouse. "Stroke data" is information that is displayed on a display based on a trajectory of coordinates input with the input device. The stroke data may be interpolated appropriately. In the following description, "hand drafted input data" refers to data having one or more pieces of stroke data. In the following description, a "hand drafted input" relates to a user input such as handwriting, drawing, and other forms of input. The hand drafted input may be performed via touch interface, with a tactile object such as a pen or stylus or with the user's body. The hand drafted input may also be performed via other types of input, such as gesture-based input, hand motion tracking input or other touch-free input by a user. The hand drafted input includes handwriting input. The following description may refer to hand drafted input and hand drafted input data, but other forms of hand drafted input may be utilized and are within the scope of the present disclosure.

An "object" refers to an item displayed on a display based on stroked data or hand drafted input data.

The term "object" in this specification also represents an object to be displayed.

An "object" obtained based on stroke data or hand drafted input data on which handwriting recognition or hand drafted recognition is performed to be converted includes a character. The characters include kanji, or Chinese, characters, hiragana characters, katakana characters, roman characters, alphabets, numbers, pictograms, emoticons, ancient Egyptian characters, and pictographic characters. In addition, the object may include a character string that is a group of one or more characters. The object may also include a displayed stamp of a given character or a mark having meaning of such as "complete." The object may also include a shape such as a circle, a star, or an arrow. The object may also include and a line. The object may also include a math symbol (for example, +, −, ×, +, =).

A character string object is a character string (text) among various types of objects.

In the description of embodiments, a case that a character string is input by hand drafted input is described, but a hand drafted input object is not limited to a character string. As hand drafted input content, an arrow or the like may be input by hand drafted input in addition to characters such as "MOVE 10 PEOPLE, SHELTER A→SHELTER B," and at least a part of the character string including the allow may be displayed in a display component. In addition, a circle, a star, a line, a math symbol, or the like may be input by hand drafted input so as to be included in a character string, and at least a part of the character string may be displayed in a display component. The object may not be a character string, but a group of various types of objects, and in such a case, at least a part of the group of various types of objects may be displayed in a display component.

The input area is an area prepared for inputting text or hand drafted input data, for example. The maximum amount of object or the maximum number of objects that can be displayed at the same time may be set in relation to the input area. In other words, the input area is set to display a limited amount of object to be displayed. The input area is defined by, for example, a rectangular frame, but may be defined by a simple underline or may be defined by upper and lower ruled lines. In addition, the number of input areas presented on a screen is not limited to one, and may be more than one. In such a case that more than one input areas are present, input areas may be present so as to be adjacent to each other in at least one of a vertical direction and a horizontal direction like cells of a table. The maximum amount of object or the maximum number of objects that can be displayed at the same time is the number of texts or characters that can be displayed at the same time, or a width of hand drafted input data that can be displayed at the same time (the width of an input area), for example.

Displaying a display component in response to an object being input to an input area means that a text converted by character recognition performed on hand drafted input data is determined. The text may be selected by the user, or the text having the highest accuracy may be automatically determined.

The pop-up refers to a display component such as a window that appears to pop up on an operation screen of a computer. The pop-up does not necessarily have a shape of a balloon, and any shape can be used as a pop-up.

The display component can be one of various types of components serving as a component included in the screen. One example of the display component is a pop-up. In the pop-up, what the user input by hand drafted input is displayed. The what the user input includes text or a character string. A mark may be used to indicate that there is content of which all is not displayed, namely the mark can be used as an indicator. The hand drafted input content or the text is not displayed in the mark. Accordingly, in the description of the present embodiment, the pop-up may be referred to as a first display component in which what the user input by hand drafted input including text or a character string is displayed, and the mark may be referred to as a second display component in which what the user input by hand drafted input including text or a character string is not displayed.

Configuration of Apparatus

Figure 2A:
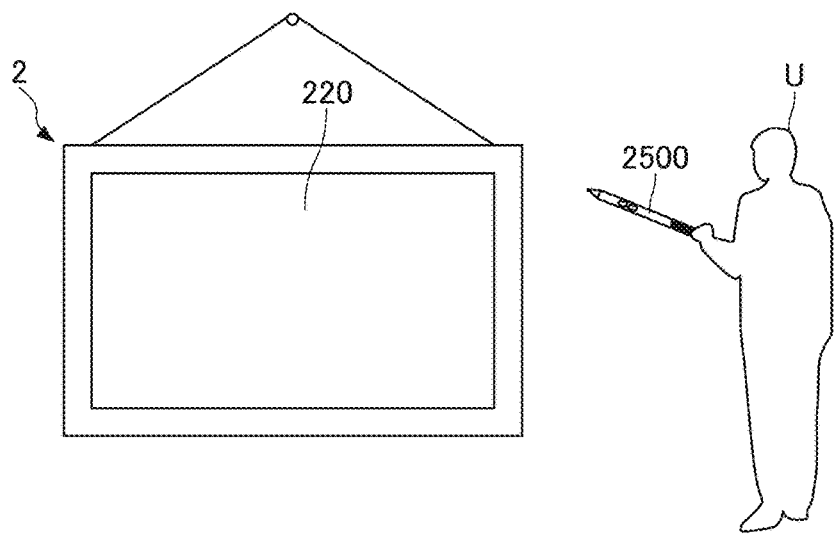
FIG. 2A to FIG. 2C are diagrams each illustrating an example of a placement of the display apparatus, according to the first embodiment of the disclosure.
Figure 2B:
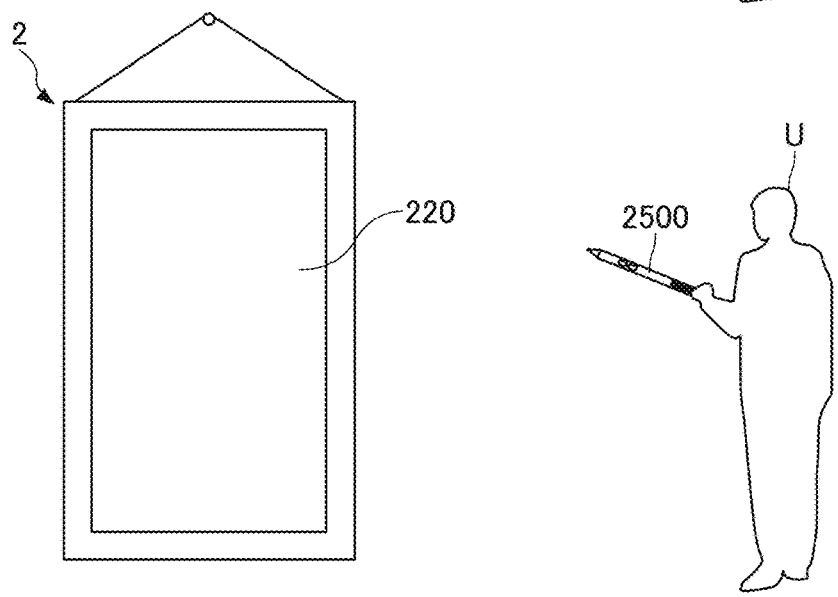
Figure 2C:
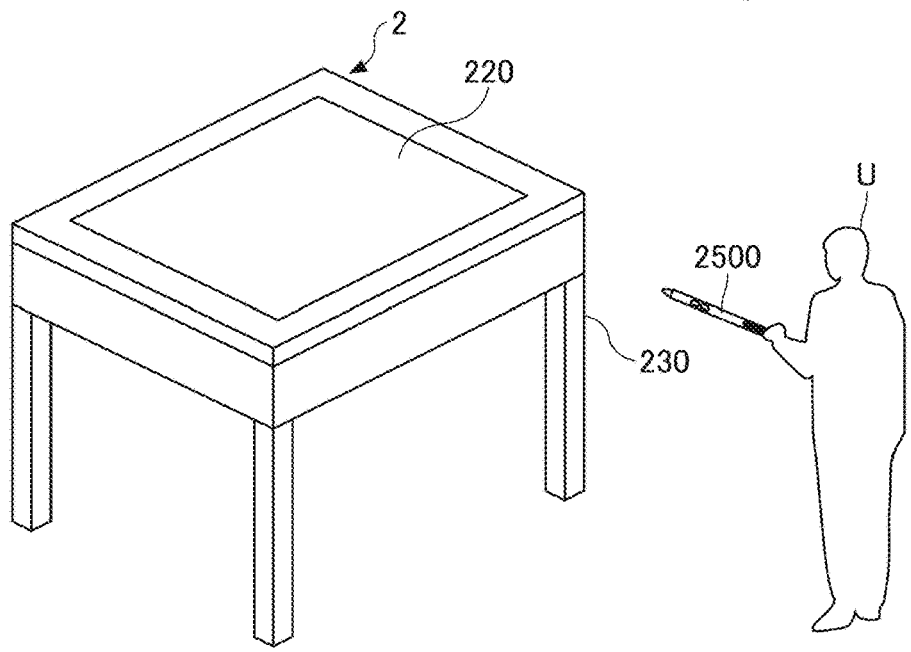

An exemplary placement of the display apparatus 2 in use according to the present embodiment is described with reference to FIGS. 2A to 2C. FIG. 2A to FIG. 2C are diagrams each illustrating an example of a placement of the display apparatus 2 in use according to the present embodiment. FIG. 2A illustrates, as an example of the display apparatus 2, an electronic whiteboard having a landscape-oriented rectangular shape and being hung on a wall.

As illustrated in FIG. 2A, the display apparatus 2 includes a display 220. A user U handwrites (also referred to as "inputs" or "draws"), for example, a character on the display 220 using a pen 2500.

FIG. 2B illustrates, as another example of the display apparatus 2, an electronic whiteboard having a portrait-oriented rectangular shape and being hung on a wall.

FIG. 2C illustrates, as another example, the display apparatus 2 placed on the top of a desk 230. Since the display apparatus 2 has a thickness of about 1 centimeter, the desk 230 does not need to be adjusted when the display apparatus 2 is placed on the top of the desk 230, which is a general-purpose desk. Further, the display apparatus 2 is portable and easily moved by the user.

Examples of an input method of coordinates by the pen 2500 include an electromagnetic induction method and an active electrostatic coupling method. In other example, the pen 2500 further has functions such as pen pressure detection, inclination detection, a hover function (displaying a cursor before the pen is brought into contact), or the like.

Hardware Configuration

Figure 3:
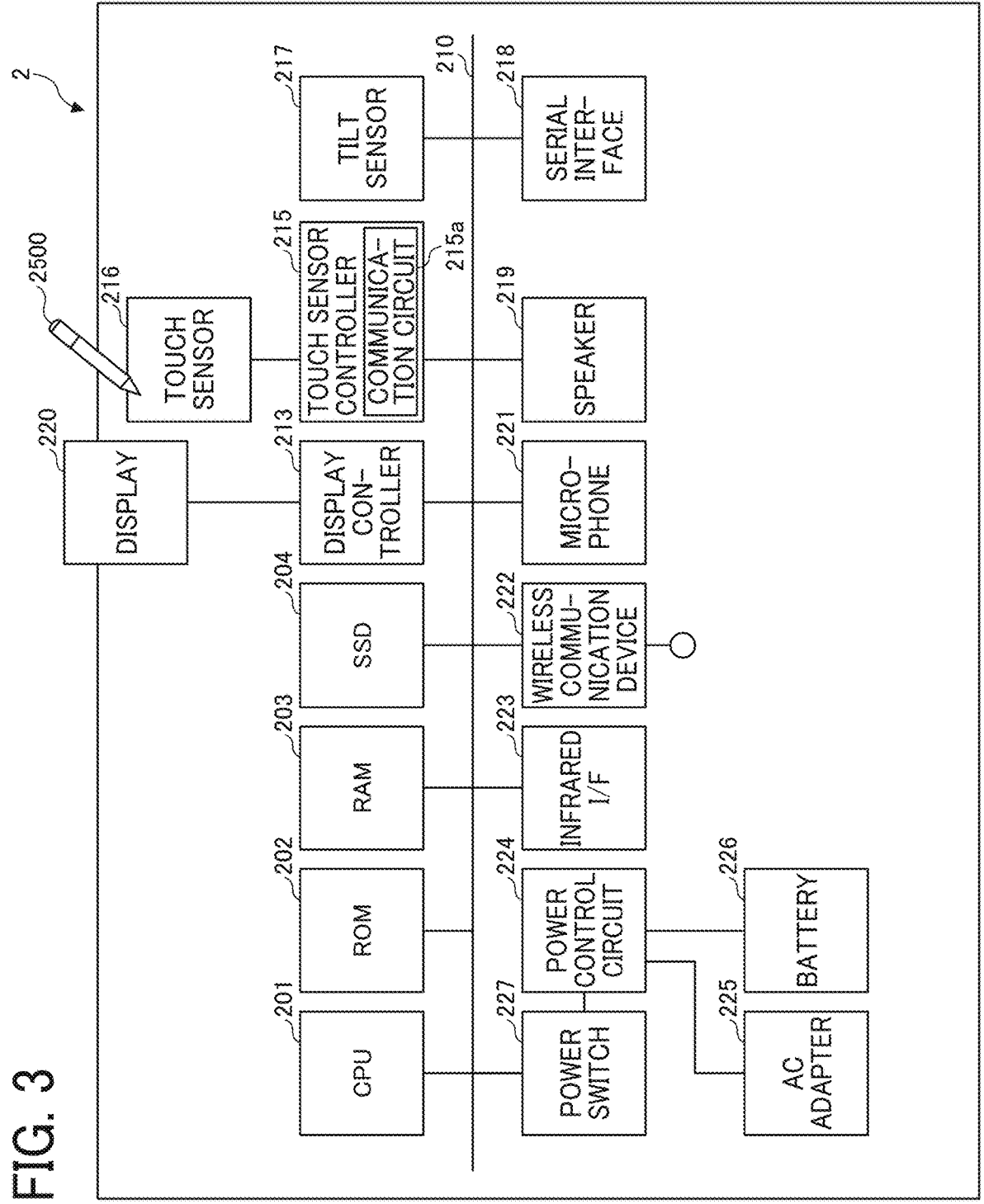
FIG. 3 is a block diagram illustrating an example of a hardware configuration of the display apparatus according to the first embodiment of the disclosure.

A hardware configuration of the display apparatus 2 according to the present embodiment is described with reference to FIG. 3. The display apparatus 2 has a configuration of an information processing apparatus or a computer as illustrated in FIG. 3. FIG. 3 is a block diagram illustrating an example of the hardware configuration of the display apparatus 2. As illustrated in FIG. 3, the display apparatus 2 includes a central processing unit (CPU) 201, a read only memory (ROM) 202, a random access memory (RAM) 203, and a solid state drive (SSD) 204.

The CPU 201 controls overall operation of the display apparatus 2. The ROM 202 stores a control program such as an initial program loader (IPL) to boot the CPU 201. The RAM 203 is used as a work area for the CPU 201.

The SSD 204 stores various data such as an operating system (OS) and a program for the display apparatus 2. The program may be an application program that runs on an information processing apparatus equipped with a general-purpose OS such as WINDOWS, MAC OS, ANDROID, and IOS. In this case, the display apparatus 2 is usually used as a general-purpose information processing apparatus. However, when a user executes an installed application program, the display apparatus 2 receives handwriting, or hand drafted input, performed by the user similarly to a dedicated display apparatus.

The display apparatus 2 further includes a display controller 213, a touch sensor controller 215, a touch sensor 216, a display 220, a power switch 227, a tilt sensor 217, a serial interface 218, a speaker 219, a microphone 221, a wireless communication device 222, an infrared interface (I/F) 223, a power control circuit 224, an alternating current (AC) adapter 225, and a battery 226.

The display controller 213 controls display of an image output to the display 220. The touch sensor 216 detects that the pen 2500, a user's hand or the like is brought into contact with the display 220. The pen or the user's hand is an example of input device. The touch sensor 216 also receives a pen identifier (ID).

The touch sensor controller 215 controls processing of the touch sensor 216. The touch sensor 216 performs coordinate input and coordinate detection. A method of inputting and sensing coordinates is described. For example, in a case of optical sensing, two light receiving and emitting devices disposed on both upper side ends of the display 220 emit infrared ray (a plurality of lines of light) in parallel to a surface of the display 220. The infrared ray is reflected by a reflector provided around the display 220, and two light-receiving elements receive light returning along the same optical path as that of the emitted light. The touch sensor 216 outputs position information of the infrared ray that is blocked by an object after being emitted from the two light receiving and emitting devices, to the touch sensor controller 215. Based on the position information of the infrared ray, the touch sensor controller 215 detects a specific coordinate that is touched by the object. The touch sensor controller 215 further includes a communication unit 215*a* for wireless communication with the pen 2500. For example, when communication is performed in compliance with a standard such as BLUETOOTH, a commercially available pen can be used. If one or more pens 2500 are registered to the communication unit 215*a* in advance, the display apparatus 2 and the pen 2500 communicates with each other without the user's manual operation of configuring connection settings between the pen 2500 and the display apparatus 2.

The power switch 227 turns on or off the power of the display apparatus 2. The tilt sensor 217 detects the tilt angle of the display apparatus 2. The tilt sensor 217 is mainly used to detect whether the display apparatus 2 is being used in any of the states in FIG. 2A, 2B, or 2C. For example, the display apparatus 2 automatically changes the thickness of characters or the like depending on the detected state.

The serial interface 218 is an interface to connect to extraneous sources such as a universal serial bus (USB). The serial interface 218 is used to input information from extraneous sources. The speaker 219 is used to output sound, and the microphone 221 is used to input sound. The wireless communication device 222 communicates with a terminal carried by the user and relays the connection to the Internet, for example.

The wireless communication device 222 performs communication in compliance with, for example. Wi-Fi or BLUETOOTH. Any suitable standard can be applied other than the Wi-Fi and BLUETOOTH. The wireless communication device 222 forms an access point. When a user sets a service set identifier (SSID) and a password that the user obtains in advance in the terminal carried by the user, the terminal is connected to the access point.

It is preferable that two access points are provided for the wireless communication device 222 as follows:
(a) Access point to the Internet; and (b) Access point to Intra-company network to the Internet. The access point (a) is for users other than, for example, company staffs. The access point (a) does not allow access from such users to the intra-company network but allow access to the Internet. The access point (b) is for intra-company users and allows such users to access the intra-company network and the Internet.

The infrared I/F 223 detects another display apparatus 2 provided adjacent to the own display apparatus 2. The infrared I/F 223 detects an adjacent display apparatus 2 using the straightness of infrared rays. Preferably, one infrared I/F 223 is provided on each side of the display apparatus 2. This configuration allows the display apparatus 2 to detect a direction in which an adjacent display apparatus 2 is arranged. Such arrangement extends the screen. Accordingly, the user can instruct the adjacent display apparatus 2 to display a previous handwritten object. In other words, one display 220 (screen) corresponds to one page, and the adjacent display 220 displays the handwritten object on a separate page.

The power control circuit 224 controls the AC adapter 225 and the battery 226, which are power supplies of the display apparatus 2. The AC adapter 225 converts alternating current shared by a commercial power supply into direct current.

In a case that the display 220 is a so-called electronic paper, little or no power is consumed to maintain display of an image, and the display apparatus 2 may be driven by the battery 226, accordingly. This allows the display apparatus 2 to be used as, for example, a digital signage that is also usable in a place, such as a place in the open air, where a power source is hardly secured.

The display apparatus 2 further includes a bus line 210. The bus line 210 is an address bus or a data bus that electrically connects the elements illustrated in FIG. 3, such as the CPU 201, to each other.

The touch sensor 216 is not limited to the optical sensing, but may use, for example, a capacitance touch panel that identifies a contact position by detecting a change in capacitance. Further, the touch sensor 216 may use a resistance film touch panel that identifies a contact position by a change in voltage of two opposing resistance films. In another example, the touch sensor 216 may use an electromagnetic induction touch panel that identifies a contact position by detecting electromagnetic induction caused by contact of an object to the display, or may use various sensing devices. The touch sensor 216 can be a type that does not use an electronic pen to detect whether the pen tip is in contact with the surface of the display 220 or not. In this case, a fingertip or a pen-shaped stick is used for touch operation. In addition, the pen 2500 may have any suitable shape other than a slim pen shape.

Functions

Figure 4:
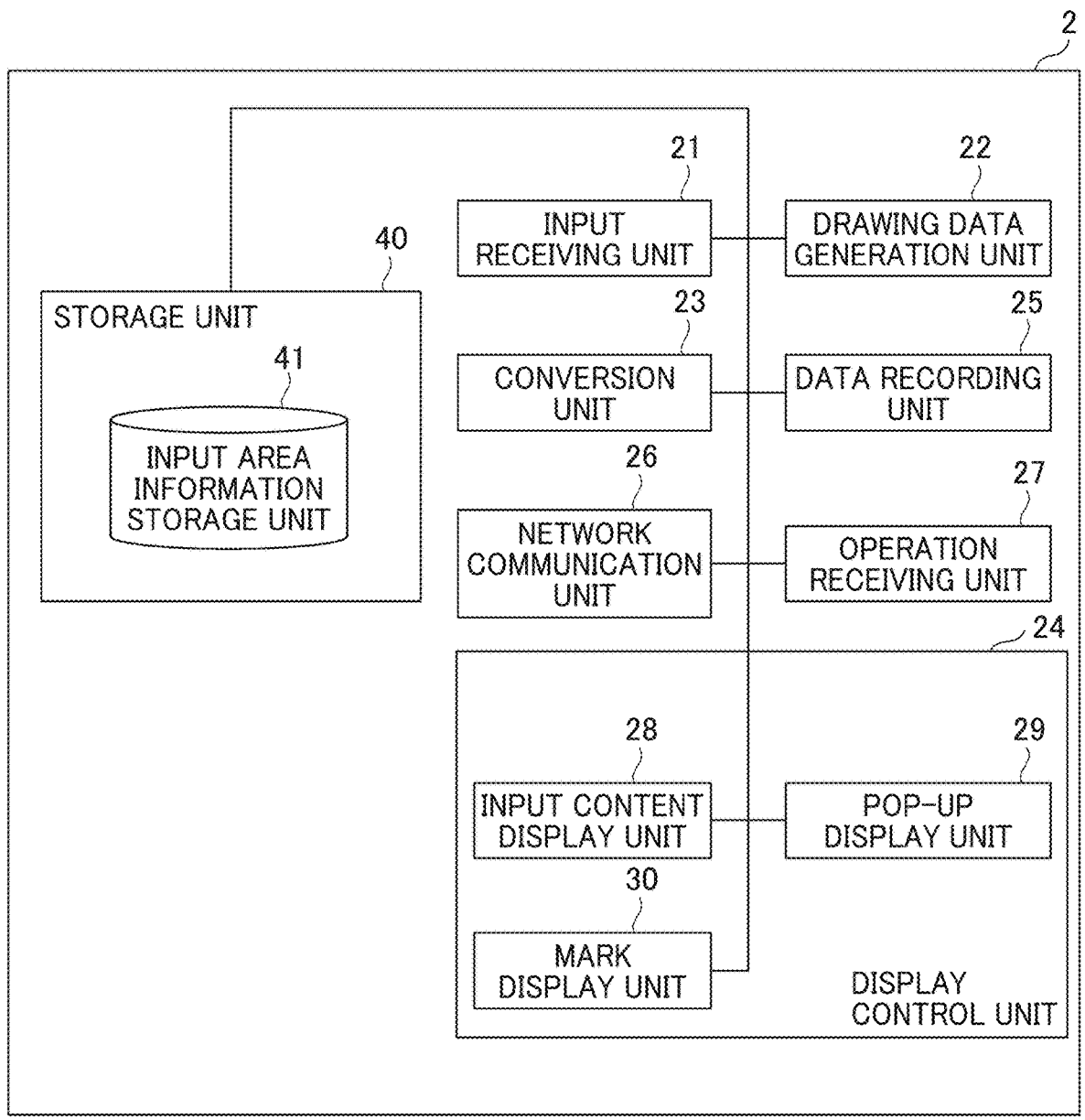
FIG. 4 is a block diagram illustrating a functional configuration of the display apparatus according to the first embodiment of the disclosure.

A functional configuration of the display apparatus 2 according to the present embodiment is described below with reference to FIG. 4. FIG. 4 is a block diagram illustrating an example of the functional configuration of the display apparatus 2 according to the present embodiment. The display apparatus 2 includes an input receiving unit 21, a drawing data generation unit 22, a conversion unit 23, a display control unit 24, a data recording unit 25, a network communication unit 26, an operation receiving unit 27, an input content display unit 28, a pop-up display unit 29, and a mark display unit 30. The functional units of the display apparatus 2 are implemented by or are caused to function by operation of any of the components illustrated in FIG. 3 according to an instruction from the CPU 201 according to a program loaded from the SSD 204 to the RAM 203.

The input receiving unit 21 receives an input of stroke data (coordinate point sequence) by detecting coordinates of a position at which an input device, such as the pen 2500 contacts the touch sensor 216. The drawing data generation unit 22 acquires coordinates of each position touched by the pen tip of the pen 2500 from the input receiving unit 21.

The drawing data generation unit 22 connects a plurality of contact coordinates into a coordinate point sequence by interpolation, to generate stroke data.

The conversion unit 23 performs character recognition processing on one or more pieces of stroke data (hand drafted input data), namely one or more pieces of stroke data corresponding to one or more strokes, input by a hand drafted input operation of the user and converts the stroke data into text. The text is a character code. The conversion unit 23 recognizes characters (multilingual languages such as English as well as Japanese), numbers and symbols (%, $, &, etc.), shapes (lines, circles, triangles, etc.) concurrently with a pen operation that is a user operation. Although various algorithms have been proposed for the recognition method, a detailed description is omitted on the assumption that known techniques can be used in the present embodiment.

The data recording unit 25 stores hand drafted input data input on the display apparatus 2, a converted character string, a screenshot on a personal computer (PC) screen, a file, and the like in a storage unit 40. The network communication unit 26 connects to a network such as a local area network (LAN), and transmits and receives data to and from other devices via the network.

The operation receiving unit 27 receives selection of a particular character from a plurality of conversion candidates in relation to character recognition based on the coordinates at which the pen 2500 is in contact, or receives pressing of a menu.

The display control unit 24 includes the input content display unit 28, the pop-up display unit 29, and the mark display unit 30. The display control unit 24 displays, on the display 220, for example, hand drafted input data, a character string converted from the hand drafted input data, and an operation menu to be operated by the user.

The input content display unit 28 displays the input text 10 in the input area 9 with a range of the maximum number of characters that can be displayed set in relation to the input area 9. The input content display unit 28 also performs processing for generating a blank space in the input area 9.

When the input text 10 that does not fit in the input area 9 is present, and a part of the input text 10 is not displayed in the input area 9, the pop-up display unit 29 displays all of or a part of the input text 10 in a pop-up manner.

When the input text 10 that does not fit in the input area 9 is present, and a part of the input text 10 is not displayed in the input area 9, the mark display unit 30 displays the mark 302 in or around the input area 9.

The display control unit 24 displays the text converted from the stroke data, or the one or more pieces of stroke data, in the input area, and in a case that a part of the text is not displayed in the input area, displays the part of the text in a display component that is related to the text.

In addition, the display apparatus 2 includes the storage unit 40 implemented by, for example, the SSD 204 or the RAM 203 illustrated in FIG. 3, and the storage unit 40 includes an input area information storage unit 41.

FIG. 5 is a diagram illustrating an example of input area information stored in the input area information storage unit 41. The input area information is information set in relation to the input area 9.

The item of input area ID is identification information of the input area 9.

The item of coordinates indicates x coordinate and y coordinate of the upper left vertex of the input area 9 on the display of the display apparatus 2.

The item of size is vertical and horizontal lengths of the input area 9.

The item of font specifies a font of the input text 10 input to the input area 9.

The item of font size specifies a size of the font of the input text 10 input to the input area 9.

The item of font color specifies a color of the input text 10 input to the input area 9.

The item of font alignment specifies alignment of the input text 10 input to the input area 9 in the horizontal direction (leftward, center, rightward) and in the vertical direction (upward, center, downward).

The item of margin of the input area 9 specifies a margin from the input text 10 to the frame of the input area 9 from among large, medium, and small.

The item of dictionary specifies a conversion dictionary used for conversion of one or more strokes input to the input area 9. The display apparatus 2 can improve recognition accuracy by registering a dictionary for each input area 9. In addition, hiding an operation guide may be set in relation to the input area 9.

Details of the operation guide are described later with reference to FIG. 7.

The item of the maximum number of characters that can be displayed is the maximum number of characters that can be displayed within the input area 9.

The item of input text indicates text input to the input area 9.

The item of degree of importance indicates a degree of importance of the input text 10 with respect to the input area 9 from among low, medium, and high. The pop-up display unit 29 can change a period of time during which the pop-up is kept being displayed, according to the degree of importance. When the degree of importance is high, the display apparatus 2 may continuously display the pop-up. In addition, the mark display unit 30 can change the display state of the mark, such as the color or the brightness of the mark according to the degree of importance.

Inputting Text to Input Area

An example of inputting the input text 10 to the input area 9 is described with reference to FIGS. 6A and 6B. FIGS. 6A and 6B are diagrams each illustrating the input text 10 input to the input area 9 according to the present embodiment. When the input area 9 of which the coordinates are set in advance and a circumscribed rectangle of hand drafted input data input at input coordinates of the pen 2500 overlap each other by a certain amount or more, the input receiving unit 21 determines that the input to the input area 9 is performed.

The maximum number of characters that can be displayed within the input area 9 and the number of characters of the input text 10 are as follows.

The maximum number of characters that can be displayed: 12

The number of characters of input text: 26

FIG. 6A is a diagram illustrating an example of display in which the input text 10 is being input halfway. After that, even w % ben the user inputs the entire text of the input text 10, a part of the text is not displayed in the input area 9 (see FIG. 6B).

Figure 7A:
FIGS. 7A to 7C are diagrams illustrating a display transition in relation to an operation guide, according to the first embodiment of the disclosure.
Figure 7B:
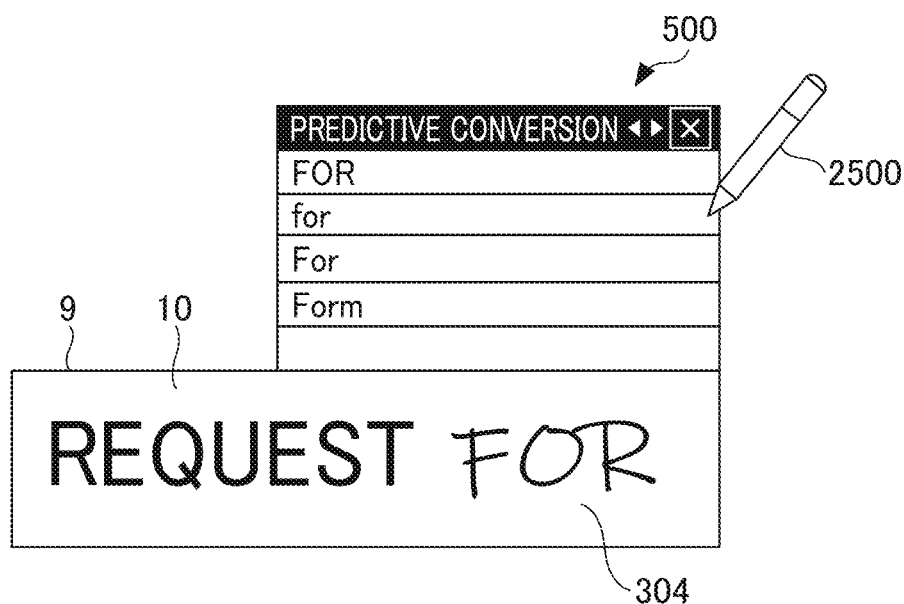
Figure 7C:

Inputting the text illustrated in FIGS. 6A and 6B may be performed using an operation guide 500. FIGS. 7A to 7C are diagrams illustrating a display transition in relation to the operation guide 500 according to the present embodiment. FIG. 7A is a diagram illustrating an example of display in which input "REQUEST" is completed according to a user operation. In addition, hand drafted input data 304 of "FOR" is input by a hand drafted input operation of the user. The conversion unit 23 displays the operation guide 500 in the proximity of the hand drafted input data 304 when a certain period of time has passed from pen-up. The pen-up means that the input device, such as the pen 2500, in contact with a display (touch panel) is turned to be separated from the display.

FIG. 7B is a diagram illustrating an example of the operation guide 500. As a result of recognition processing, the conversion unit 23 displays high-order conversion candidates (a plurality of texts) having high accuracy in the operation guide 500. In FIG. 7B, "FOR" is a recognition result of the hand drafted input data 304, which is correctly recognized. In addition, the conversion unit 23 can perform predictive conversion and can display a word or phrase including "FOR" in the operation guide 500.

When the user selects one of the conversion candidates with the pen 2500, a text 305 corresponding to the selected conversion candidate is replaced with the hand drafted input data 304 to be displayed. In FIG. 7C, the text 305 that is "FOR" is displayed. The display control unit 24 hides, or deletes, the operation guide 500 when the conversion candidate is selected.

The diagram of FIG. 6B is the same as that of FIG. 7C, but the operation guide 500 is not displayed in relation to FIG. 6B. Whether the operation guide 500 is displayed is switched by a setting in relation to the input area 9. In the following description, unless otherwise specified, the operation guide 500 may be displayed or may not be displayed for the input of the input text 10. For example, in the input area 9 where a number or gender is input, the operation guide 500 may be set not to be displayed because erroneous conversion hardly occurs.

The operation guide 500 is displayed when a state of pen-up performed by the user continues for a certain period of time or more, and is not always displayed every time one character of hand drafted input data is input by hand drafted input, accordingly.

Display Example of Pop-up

The display apparatus 2 according to the present embodiment can display a full-text pop-up and a partial-text pop-up. Which one of a full-text pop-up and a partial-text pop-up is displayed is set in advance. First, displaying a full-text pop-up is described.

Figure 8:
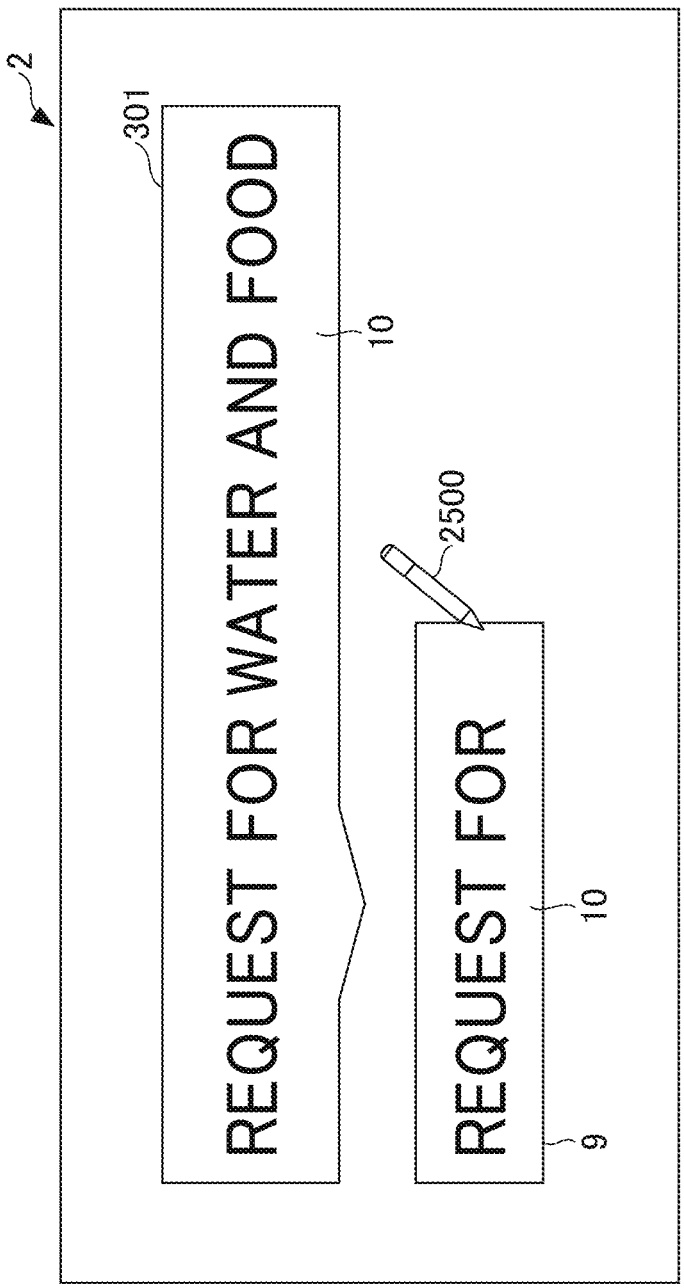
FIG. 8 is a diagram illustrating an example of displaying a full-text pop-up, according to the first embodiment of the disclosure.

FIG. 8 is a diagram illustrating an example of displaying a full-text pop-up. The pop-up display unit 29 obtains the input text 10 input to the input area 9 and displays the input text 10 as a new input text with a character size of the pop-up 301, above the input area 9. The character size of the pop-up 301 may be set in advance or may be set by the user. As illustrated in FIG. 8, the pop-up 301 is basically displayed above the input area 9. However, if there is no space above the input area 9, the pop-up is displayed below the input area 9.

The pop-up 301 in FIG. 8 is updated each time a candidate is selected from the operation guide 500. In other words, since the hand drafted input data is displayed in real time while the user is inputting the hand drafted input data, the user can input the hand drafted input data while viewing the input text 10.

Figure 9:
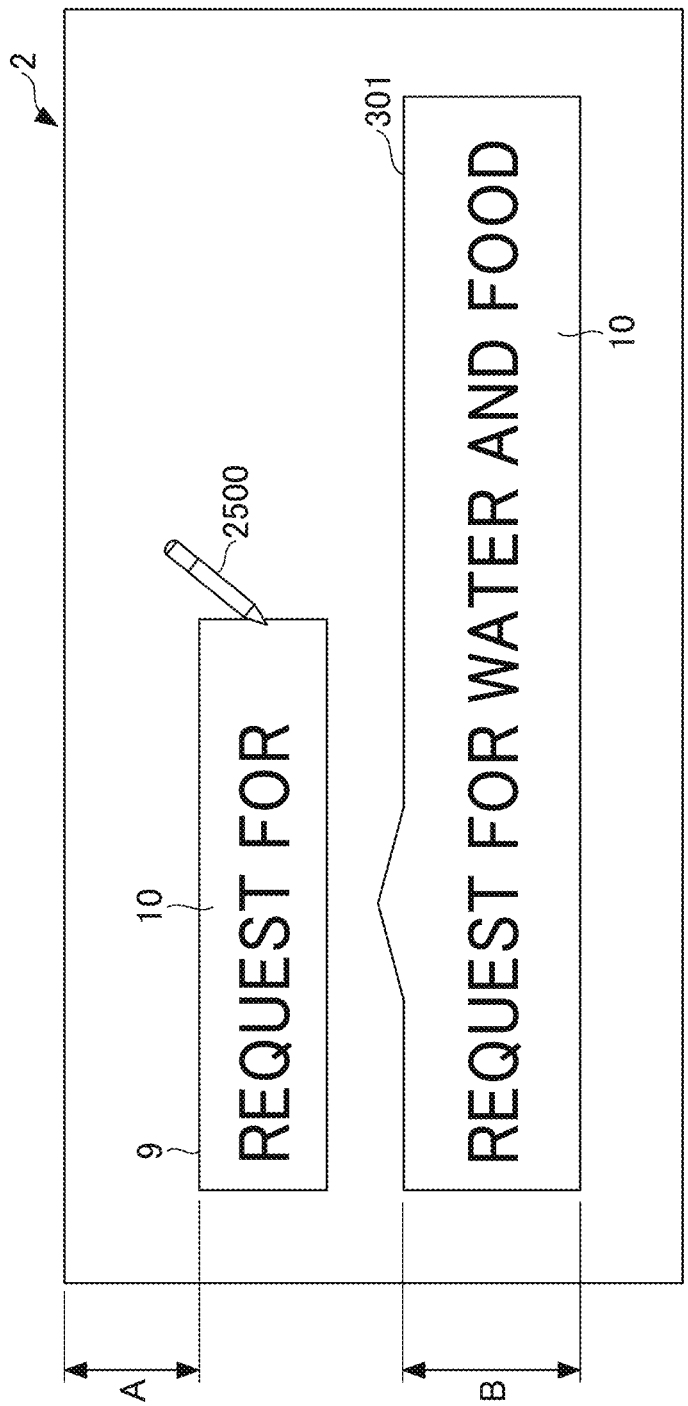
FIG. 9 is a diagram illustrating an example of displaying a full-text pop-up below the input area, according to the first embodiment of the disclosure.

FIG. 9 is a diagram illustrating an example of displaying a full-text pop-up below the input area 9. The pop-up display unit 29 compares a length A that is from the upper end of the input area 9 to the upper end of the display with a height B that is a height of the pop-up. When the height B of the pop-up is greater than the length A, the pop-up display unit 29 displays the pop-up below the input area 9 The height B of the pop-up is determined by the character size of the pop-up display and the margin of the pop-up. Accordingly, even when the input area 9 is close to the upper end, the pop-up display unit 29 can display a pop-up for the input text 10.

Figure 10:
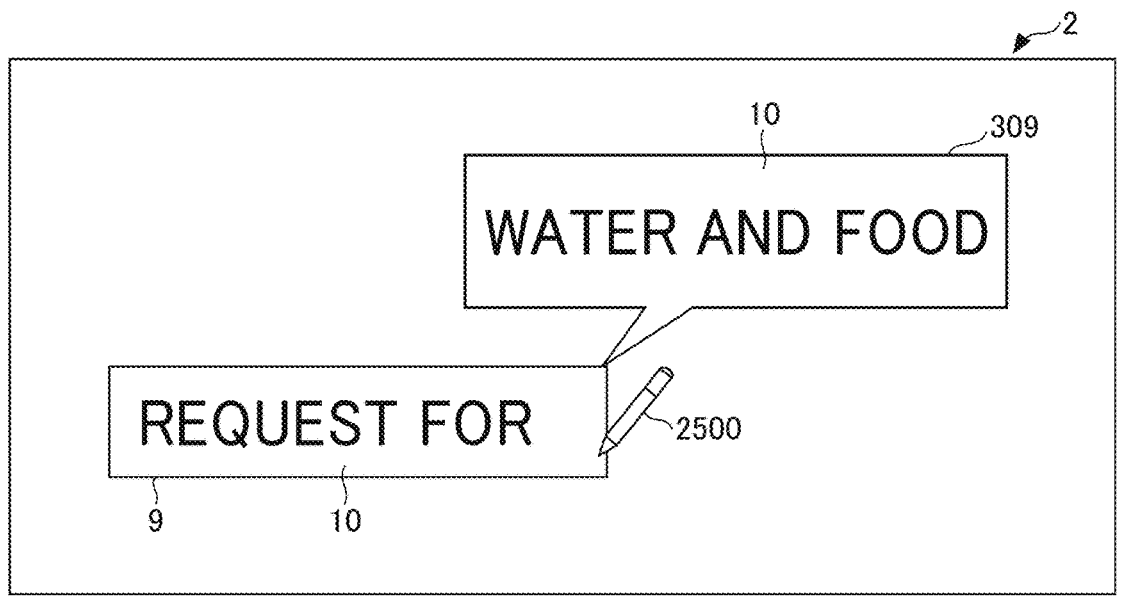
FIG. 10 is a diagram illustrating an example of displaying a partial-text pop-up, according to the first embodiment of the disclosure.

Next, displaying a partial-text pop-up is described with reference to FIGS. 10 and 11. FIG. 10 is a diagram illustrating an example of displaying a partial-text pop-up. The pop-up display unit 29 displays the partial-text pop-up by processing as described below.

The display apparatus 2 obtains a set of characters including one or more spaces corresponding to the number of characters that is obtained by subtracting the maximum number of characters that can be displayed from the number of characters of the input text 10, from the end of the input text 10.

For example, the maximum number of characters that can be displayed and the number of characters that are input are as follows.

The maximum number of characters that can be displayed: 12 The number of characters that are input: 26 ("REQUEST FOR WATER AND FOOD")

In this case, the number of characters obtained by subtracting the maximum number of characters that can be displayed from the number of characters of the input text 10 is 14 characters of "WATER AND FOOD."

The pop-up display unit 29 displays, above the input area 9, a pop-up 309 having a part of the input text 10 obtained from the end of the input text 10 as a new input text with a character size corresponding to the pop-up 309. In FIG. 10, 14 characters of "WATER AND FOOD" are displayed in the pop-up 309. Accordingly, the user can read the text displayed in a pop-up manner following to the text in the input area 9, and the overlapping of text can be reduced.

Figure 11:
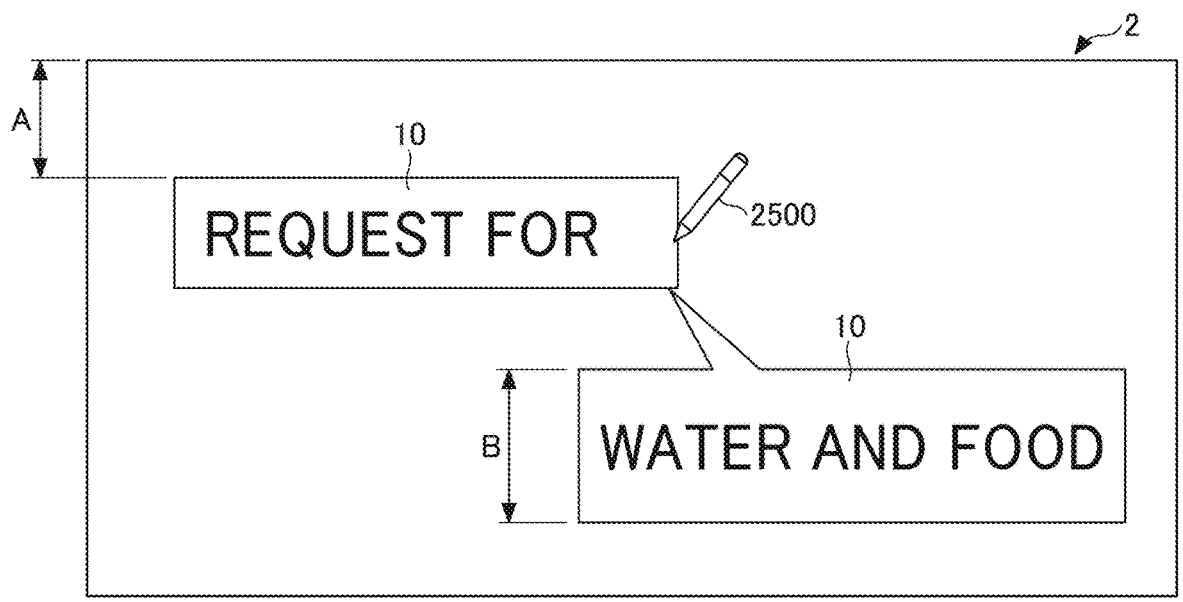
FIG. 11 is a diagram illustrating an example of displaying a partial-text pop-up below the input area, according to the first embodiment of the disclosure.

FIG. 11 is a diagram illustrating an example of displaying a partial-text pop-up below the input area 9. In substantially the same manner as the case of displaying a full-text pop-up, the pop-up display unit 29 compares the length A, which is from the upper end of the input area 9 to the upper end of the display, with the height B, which is a height of the pop-up, and when the height B, which is a height of the pop-up, is greater than the length A, the pop-up display unit 29 displays the pop-up 309 below the input area 9. The height B, which is a height of the pop-up, is determined by a character size of the pop-up display and the margin of the pop-up. Accordingly, even when the input area 9 is close to the upper end, the pop-up display unit 29 can display a pop-up for the input text 10.

As described above, a position at which a pop-up is to be displayed is determined based on a relationship between a distance between an upper end of the input area and an end of the display and a height of the pop-up.

Figure 12:
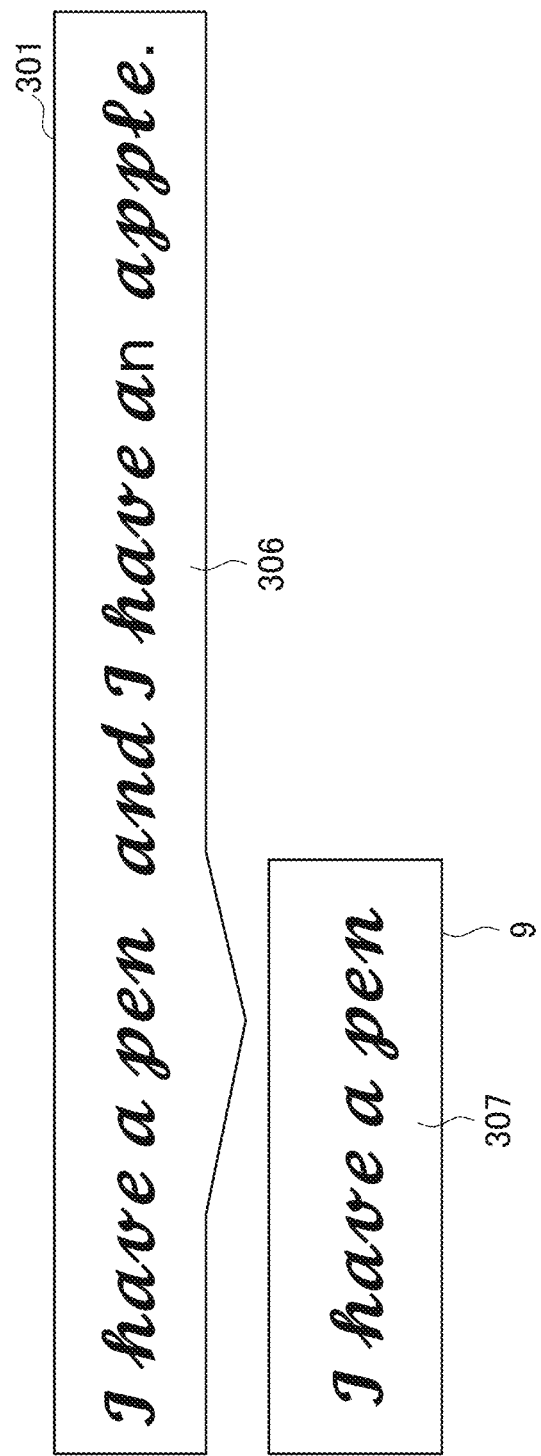
FIG. 12 is a diagram illustrating an example of displaying a pop-up for hand drafted input data, according to the first embodiment of the disclosure.

The pop-up display is also available for the hand drafted input data on which text conversion has not been performed. FIG. 12 is a diagram illustrating an example of displaying a pop-up for hand drafted input data. Hand drafted input data 306 input to the input area 9 is "I have a pen and I have an apple.", and hand drafted input data 307 of "I have a pen" that is a part of the hand drafted input data 306 is displayed in the input area 9. There may be no concept of the number of characters for the hand drafted input data 307, or even if there is the concept of the number of characters, the user can change the character size. Accordingly, when the horizontal width of the hand drafted input data 307 is greater than the width of the input area 9, the pop-up display unit 29 displays all the hand drafted input data 306 in a pop-up manner. As described above, in the case of hand drafted input data, a pop-up can be displayed under the same or similar conditions.

The example of FIG. 12 illustrates displaying a full-text pop-up, however, in alternative to the full-text pop-up, the pop-up display unit 29 may display a partial-text pop-up. In this case, the pop-up display unit 29 obtains, from the end of the hand drafted input data, a part of the hand drafted input data corresponding to a length obtained by subtracting the width of the input area from the width of the hand drafted input data of which the input is currently completed. The pop-up display unit 29 displays the part of the hand drafted input data obtained from the end of the hand drafted input data in a pop-up manner.

Popup Display after Input

After the user inputs the input text 10 to the input area 9, the pop-up display unit 29 hides or deletes the pop-up 301 or the pop-up 309 displayed as illustrated in FIGS. 9 to 12. Note that "after the user inputs the input text 10 to the input area 9" means that a certain period of time has elapsed since the user performs pen-up with respect to the input area 9.

In addition, after the pop-up 301 or the pop-up 309 displayed during the input is hided, all or a part of the input text 10 is displayed in a pop-up manner in response to a user operation of pressing or hovering the input area 9 with the pen 2500. Hovering refers to a state in which the pen or a finger stands still for a certain period of time at a position of a predetermined height or less from the touch panel. The input text 10 displayed in a pop-up manner is deleted after a certain period of time has passed since a start time of the display. When the user operates the pop-up 301 or the pop-up 309 with the pen 2500, the pop-up display may be continued.

Displaying Mark

After the user inputs the input text 10 to the input area 9, the pop-up display is performed by a user operation. Accordingly, the user may have difficulty to determine whether the entire input text 10 is displayed within the input area 9.

Figure 13:
FIG. 13 is a diagram illustrating an example of displaying a mark in the input area, according to the first embodiment of the disclosure.

Accordingly, as illustrated in FIG. 13, the mark display unit 30 displays the mark 302 in the input area 9. FIG. 13 is a diagram illustrating an example of displaying the mark 302 in the input area 9. The mark 302 indicates that the input text 10 of which a part is not displayed in the input area 9 is present. The mark display unit 30 preferably displays the mark 302 at a timing when the number of characters being input reaches "the maximum number of characters that can be displayed in the in the input area 10." However, the mark 302 may be displayed after the user completely inputs the input text 10 to the input area 9.

When the user presses the mark 302 with the pen 2500, the input text 10 is displayed by a full-text pop-up or a partial-text pop-up. Which one of a full-text pop-up and a partial-text pop-up is displayed is set in advance.

Figure 14:
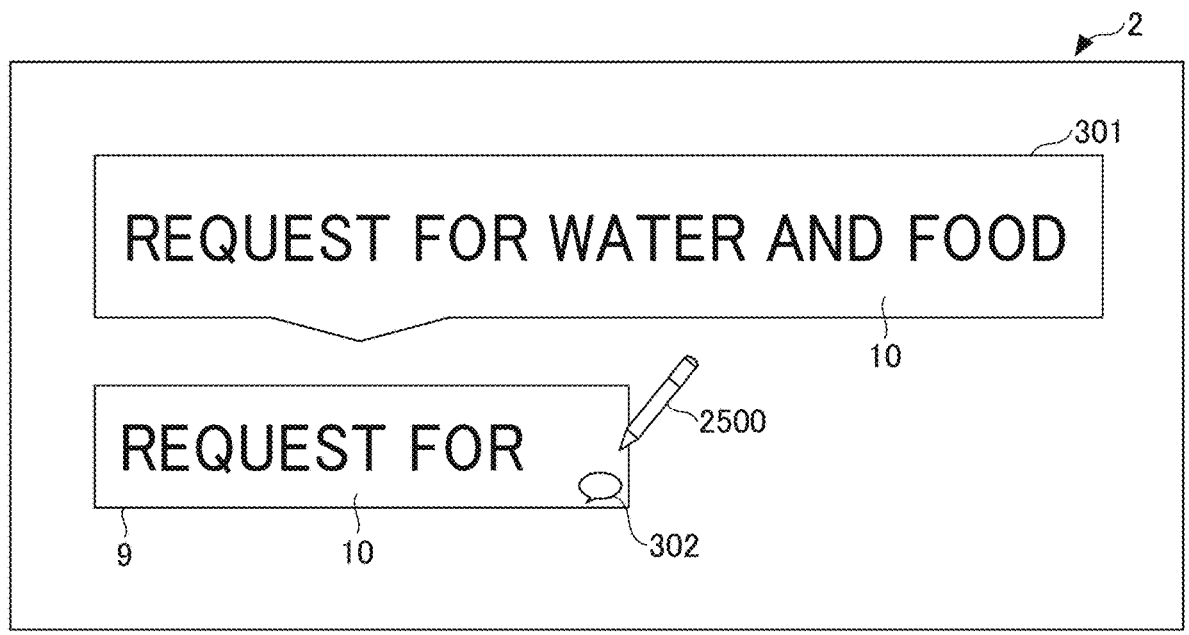
FIG. 14 is a diagram illustrating an example of a full-text pop-up displayed when the mark is pressed, according to the first embodiment of the disclosure.

FIG. 14 is a diagram illustrating an example of a full-text pop-up displayed when the mark 302 is pressed. In FIG. 14, the pop-up 301 that is a full-text pop-up is displayed above the input area 9. The pop-up display unit 29 may display a partial-text pop-up or may display a pop-up in a lower area.

The shape of the mark 302 illustrated in the drawing is an example. The mark 302 may be a triangle displayed at a corner of the input area 9 or may be represented by a rounded corner of a frame of the input area 9. The mark 302 may be represented by changing a background color of the input area 9. The mark 302 may be displayed outside the input area 9. The mark 302 may be displayed for several seconds when the pen 2500 touches the input area 9, or may be displayed while the hovering of the pen 2500 is being detected or for several seconds from the detection.

Input Method when Blank Space of Input Area is Running Out

An input method in a case that a blank space of the input area 9 is reduced is described with reference to FIGS. 15 (15A to 15C) and 16. FIGS. 15A to 15C are diagrams illustrating an example of an input method by which a blank space is prepared in the input area 9 according to a user operation. In FIGS. 15A to 15C, the pop-up display is omitted.

Figure 15A:
FIGS. 15A to 15C are diagrams illustrating an example of an input method by which a blank space is prepared in the input area, according to the first embodiment of the disclosure.

FIG. 15A is a diagram illustrating an example of display of the input text 10 input to the input area 9. The input text 10 of which a part is not displayed in the input area 9 is present. A user who wants to make a blank space inputs a stroke 310 by hand drafted input from right to left in the input area 9. The input content display unit 28 shifts the input text 10 to the left by the determined number of characters.

Figure 15B:

FIG. 15B is a diagram for describing the number of characters to be shifted. The input content display unit 28 determines a value as the number of characters to be shifted by dividing the length of the stroke 310 by the character size. When the length of the stroke 310 is 13 cm and the character size is 2 cm, the value is "13÷2=6 . . . 1" Accordingly, six characters are the number of characters to be shifted.

Figure 15C:
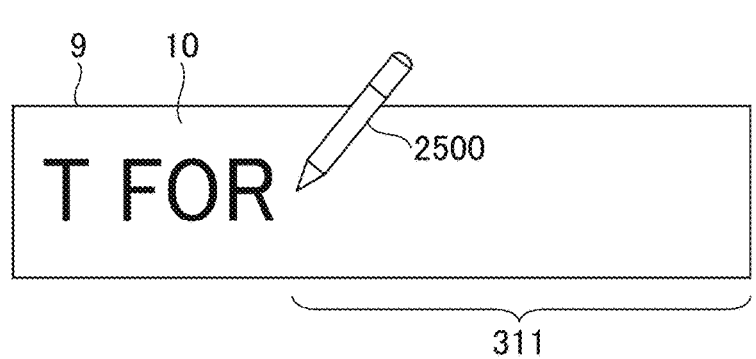

FIG. 15C is a diagram illustrating an example of display of the input area 9 in which the input text 10 is shifted to the left by six characters. In FIG. 15C, six characters are removed from the head of the input text 10 of FIG. 15B, and "T FOR" of the input text 10 is displayed in a left-aligned manner. As a result, a blank space 311 is generated in the input area 9.

FIG. 16 is a flowchart illustrating an example of a process performed by the display apparatus 2 for generating a blank space when the blank space of the input area 9 is running out as described with reference to FIG. 15 (FIGS. 15A to 15C).

The input content display unit 28 determines whether the input text 10 is present in the input area 9 (S101).

When the determination result in step S101 is Yes, the input content display unit 28 determines whether the stroke 310 from the right to the left is input by hand drafted input to the input area 9 or not (S102). In step S102, a direction of input of the stroke 310 is determined based on a start point and an end point of the stroke 310, and whether a coordinate point sequence of the stroke 310 is present within the input area 9 or not is determined.

When the determination result in step S102 is Yes, the input content display unit 28 divides the length of the stroke 310 by the character size to determine the number of characters to be shifted (S103).

Then, the input content display unit 28 causes the characters of the input text 10 currently displayed in the input area 9 to be disappeared, or deleted, by the number of characters determined in step S103 from the head of the input text 10, and displays the remaining of the input text 10 in the input area 9 by shifting the remaining of the input text 10 in a left-aligned manner (S104).

When the determination result in step S101 or S102 is No, the blank space 311 is not generated.

As described above, the blank space 311 is generated in the input area 9, and the user can input an addition to the hand drafted input data in the blank space 311 for the input of the input text 10.

The input content display unit 28 may automatically generate a blank space without a user operation. For example, when a distance between the input text 10 input to the input area 9 and a frame at the right end becomes less than a threshold value, the input content display unit 28 causes the left half of the input text 10 currently displayed to be disappeared, or deleted, and moves the right half of the input text 10 to the left.

Figure 17A:
FIGS. 17A to 17C are diagrams illustrating another example of an input method by which a blank space is prepared in the input area, according to the first embodiment of the disclosure.
Figure 17B:
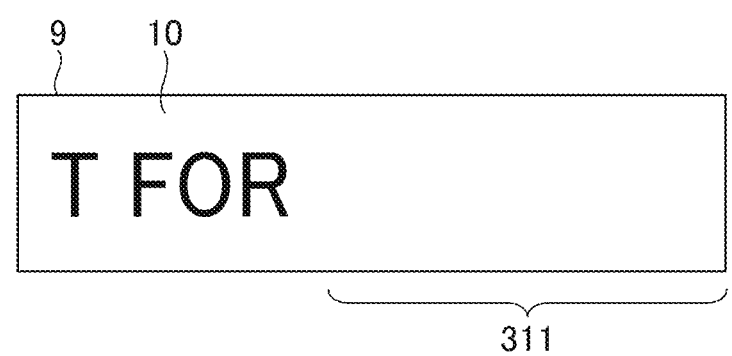
Figure 17C:
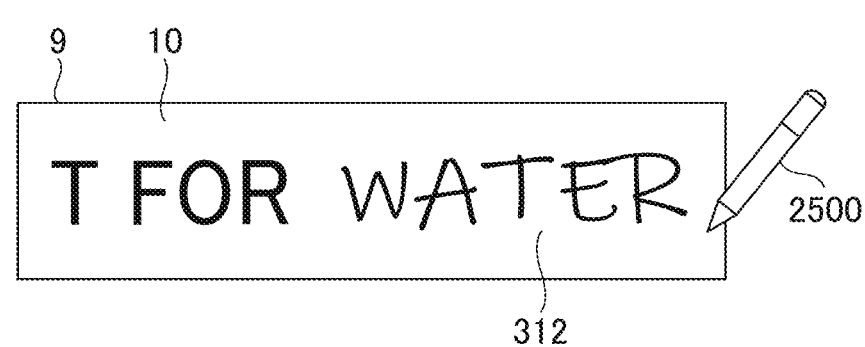

FIGS. 17A to 17C are diagrams for describing an example of a method of automatically generating a blank space. In FIGS. 17A to 17C, the pop-up display is omitted. In FIG. 17A, the distance between the input text 10 and the frame at the right end is less than the threshold value. The input content display unit 28 causes the left half of the input text 10 currently displayed to be disappeared, or deleted, and moves the right half of the input text 10 to the left. In FIG. 17B, "REQUES" that is the left half of the input text 10 ("REQUEST FOR"), which has 12 characters, is caused to be disappeared, or deleted, and "T FOR" that is the right half of the input text 10 is moved to the left, and the blank space 311 is generated.

As a result, as illustrated in FIG. 17C, the user can continuously perform hand drafted input to input hand drafted input data 312 to the blank space 311, which is illustrated in FIG. 17B.

Figure 18A:
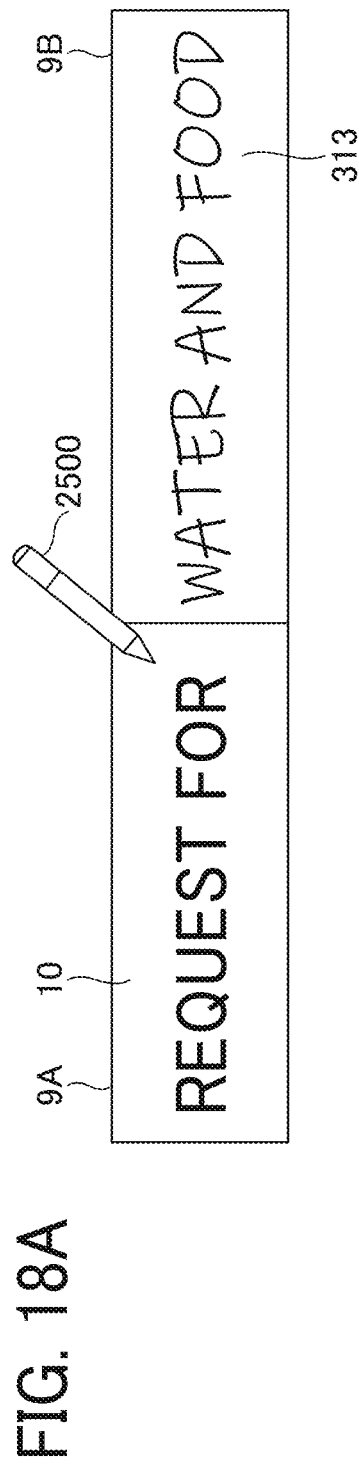
FIGS. 18A and 18B are diagrams for describing an input method by which a user inputs one or more strokes by hand drafted input to the right of the input area, according to the first embodiment of the disclosure.
Figure 18B:
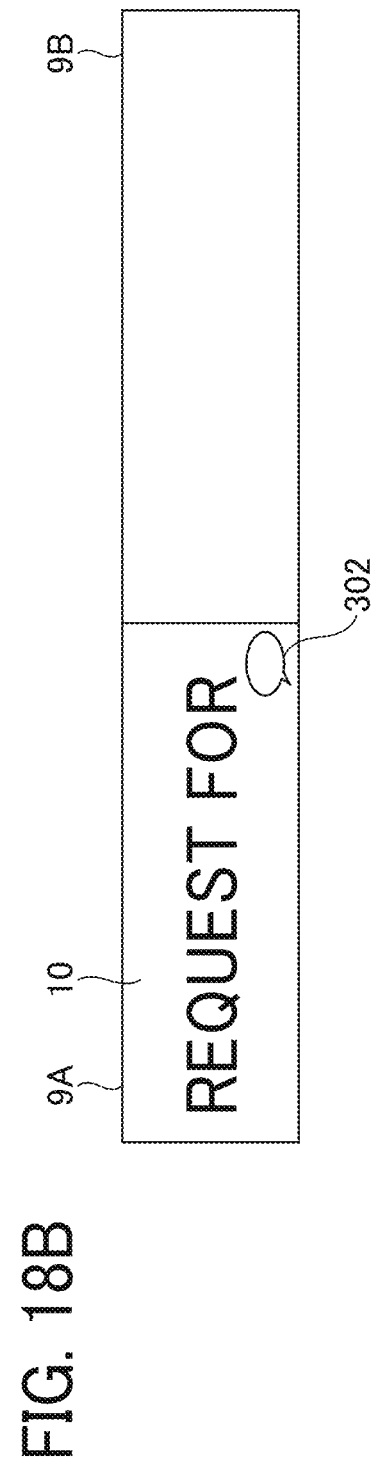

In addition, as illustrated in FIGS. 18A, FIG. 18B, and FIG. 19, as a method of inputting the input text 10 that does not fit in the input area 9, the user may input one or more strokes by hand drafted input on the right of the input area 9 in alternative to input the stroke to a blank space.

FIGS. 18A and 18B are diagrams for describing an input method by which the user inputs one or more strokes by hand drafted input to a right input area 9B that is on the right. In FIG. 18A and FIG. 18B, the pop-up display is omitted. In FIG. 18A, there are two input areas that are a left input area 9A and the right input area 9B that are adjacent to each other. The user first inputs by hand drafted input to the left input area 9A, and then inputs by hand drafted input to the right input area 9B because there is no blank space in the left input area 9A. In the right input area 9B in FIG. 18A, a set of strokes of "WATER AND FOOD" is hand drafted input data, namely displayed as it is.

When a stroke-set 313 is input by hand drafted input to the right input area 9B within a certain period of time from input of the input text 10 to the left input area 9A, the input receiving unit 21 determines that the input of the stroke-set 313 is additional input to the left input area 9A. In other words, the input receiving unit 21 restricts input to areas other than the left input area 9A. In this way, the user can input the input text 10 to the left input area 9A even when additional input by hand drafted input is performed to an area other than the left input area 9A.

The input receiving unit 21 may determine whether a stroke crosses a boundary between the left input area 9A and the right input area 9B (the frame at the left end of the right input area 9B).

FIG. 18B is a diagram illustrating an example of input areas including the left input area 9A and the right input area 9B after character recognition is performed on "WATER AND FOOD" that is input by hand drafted input to the right input area 9B in FIG. 18A. Since the number of characters of the input text 10 is greater than the maximum number of characters that can be displayed, the mark 302 is displayed in the left input area 9A.

In addition, since the hand drafted input data is deleted from the right input area 9B, the user can additionally perform hand drafted input. In alternative to the mark 302 or along with the mark 302, the pop-up display unit 29 may display a pop-up for all of or a part of the input text 10. In this case, the user can perform hand drafted input while viewing the text that has already input.

FIG. 19 is a flowchart illustrating an example of a process performed by the display apparatus 2 for receiving a hand drafted input of stroke to the right input area 9 illustrated in FIGS. 18A and 18B.

The input content display unit 28 obtains the maximum number of characters that can be displayed within the input area 9 to which input is being performed (S201).

The input content display unit 28 determines whether a stroke is input within a certain period of time from a time at which a part of the input text 10 corresponding to the maximum number of characters is input to the input area 9 (S202).

When the determination result in step S202 is Yes, the input content display unit 28 determines whether the stroke overlaps with an area on the right of the input area 9 or not (S203). The area on the right of the input area 9 may or may not be another input area 9.

When the determination result in step S203 is Yes, the input receiving unit 21 does not receive, namely rejects, input even when the stroke is input to an area other than the input area 9 (S204).

When the determination result in step S202 or S203 is No, processing is performed according to a position at which the stroke is input. For example, the input text 10 is input to a different input area 9.

Updating Pop-up

Figure 20:
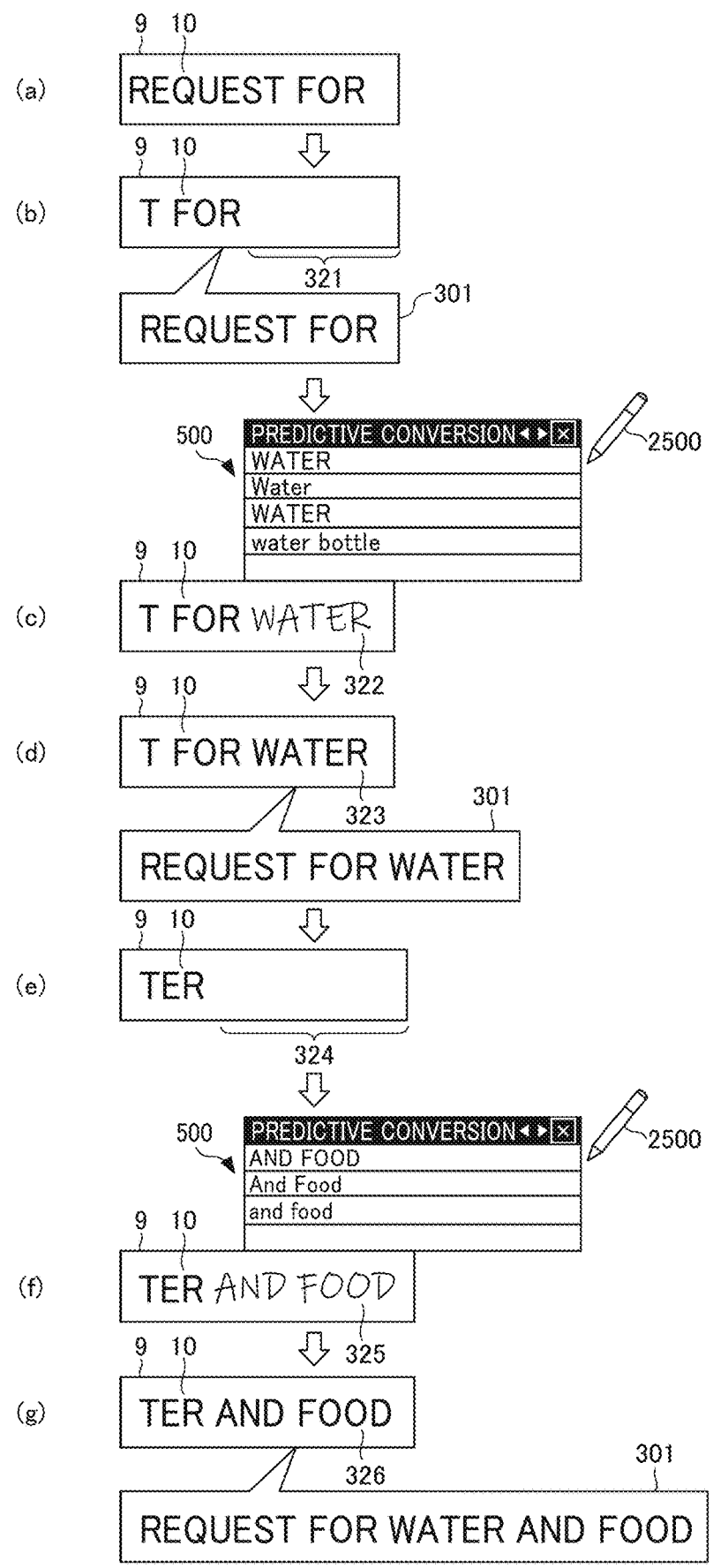
FIG. 20 is a diagram illustrating an example of a display transition in relation to an update timing of pop-up display, according to the first embodiment of the disclosure.

An update timing of the pop-up 301 or the pop-up 309 is described with reference to FIG. 20. FIG. 20 is a diagram illustrating an example of a display transition in relation to an update timing of the pop-up display. In FIG. 20, an input method by which a blank space is prepared in the input area 9 is used to describe.

As illustrated in (a) of FIG. 20, the input text 10 having the same number of characters as the maximum number of characters that can be displayed is input to the input area 9.

As illustrated in (b) of FIG. 20, the input content display unit 28 generates a blank space 321 in the input area 9 by the above-described method. In response to an event that the input text 10 does not fit in the input area 9 and a part of the input text 10 is not displayed in the input area 9, the pop-up display unit 29 displays the input text 10 in a pop-up manner. Although the pop-up 301, which is a full-text pop-up, is displayed in (b) of FIG. 20, the pop-up 309, which is a partial-text pop-up, may be displayed alternatively. In this case, the input content display unit 28 obtains the number of characters by subtracting the number of characters corresponding to the blank space from the number of characters of the input text 10 that is currently input and displayed from the head of the input text 10 and displays a part of the input text 10 as a partial-text pop-up.

As illustrated in (c) of FIG. 20, the user inputs hand drafted input data 322 of "WATER." The conversion unit 23 performs character recognition, and the display control unit 24 displays the operation guide 500. The user has selected "WATER" from the operation guide 500.

As illustrated in (d) of FIG. 20, a text 323 "WATER" that is a converted text is displayed in the input area 9. Since the text 323 is added to the input area 9, the pop-up display unit 29 updates the pop-up display. The pop-up display unit 29 may delete the pop-up once and display the pop-up again, or may add the text 323 to the pop-up being displayed.

As illustrated in (e) of FIG. 20, the input content display unit 28 generates a blank space in the input area 9 by the above-described method.

As illustrated in (f) of FIG. 20, the user inputs hand drafted input data 325 of "AND FOOD." The conversion unit 23 performs character recognition, and the display control unit 24 displays the operation guide 500. The user has selected "AND FOOD" from the operation guide 500.

As illustrated in (g) of FIG. 20, a text 326 of "AND FOOD" is displayed in the input area 9. Since the text 326 is added to the input area 9, the pop-up display unit 29 updates the pop-up display.

As described above, when a candidate is selected from the operation guide 500 and the determined input text 10 is input to the input area 9, the pop-up display is updated. There is a case that the operation guide 500 is not displayed for conversion of the number, for example. This is because the conversion accuracy of the number is high, and the user can set the operation guide 500 not to be displayed for the input area, accordingly. In such a case the pop-up display is updated at a timing of conversion.

Although the pop-up display performed in conjunction with the input of the input text 10 has been described in FIG. 20, the pop-up for the input text 10 may be displayed according to a user operation performed after the input to the input area 9 is completed (the input to the input area 9 is not performed for a certain period of time or more). The user presses the mark 302 for the pop-up display, or presses the input area 9 when the mark 302 is not displayed. The pop-up may be displayed by hovering of the pen 2500.

Process for Popup Display

Figure 21:
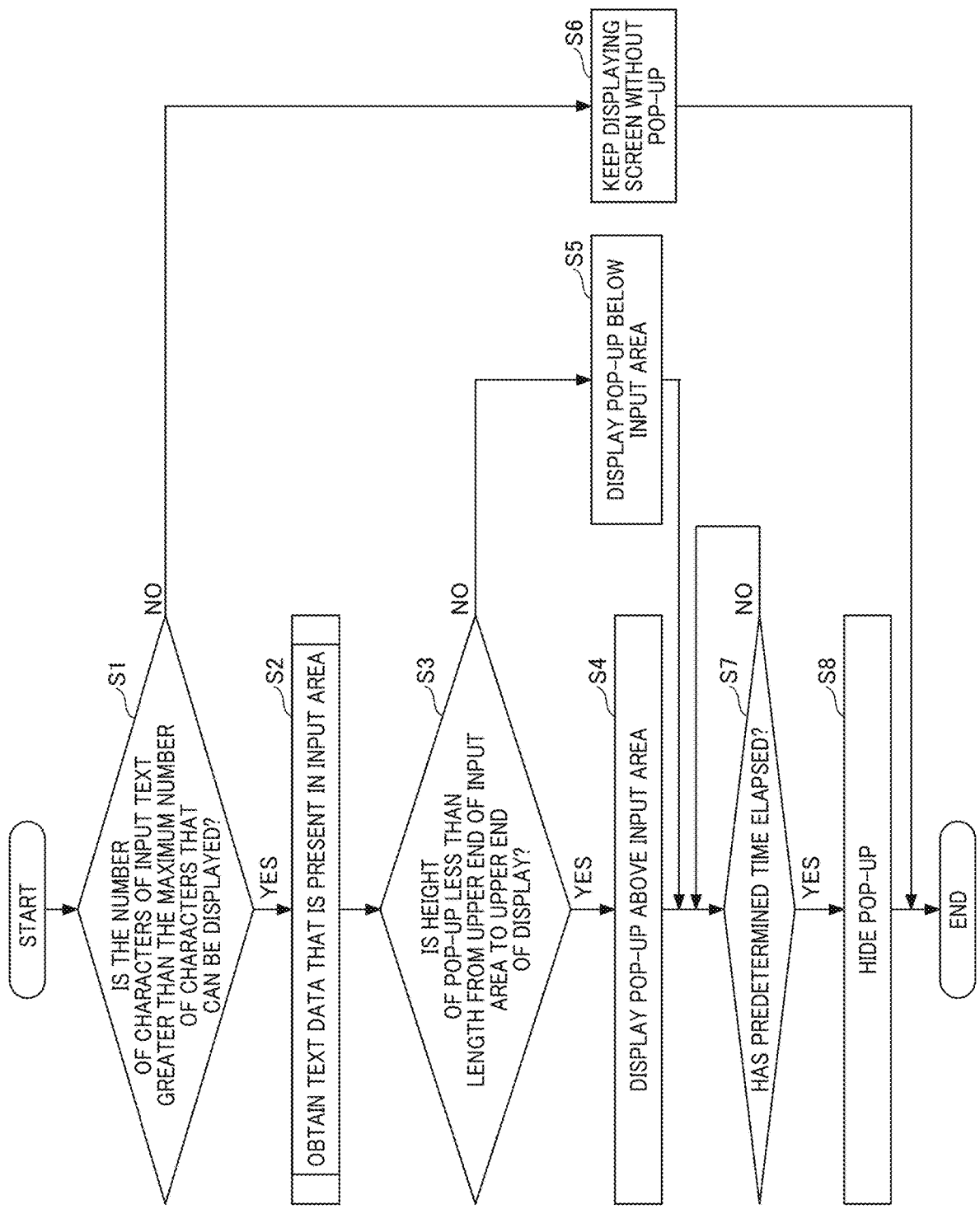
FIG. 21 is a flowchart illustrating an example of a process for displaying a pop-up, performed by the display apparatus, in a case of displaying a full-text pop-up, according to the first embodiment of the disclosure.

A process or operation for pop-up display performed by the display apparatus 2 is described with reference to FIG. 21 and FIG. 22. FIG. 21 is a flowchart illustrating an example of a process for displaying a pop-up, performed by the display apparatus 2, in a case of displaying a full-text pop-up. The process illustrated in FIG. 21 is started in response to, for example, selection of text from the operation guide 500 or determination of conversion.

The pop-up display unit 29 determines whether the number of characters of the input text 10 is greater than the maximum number of characters that can be displayed or not (S1).

When the determination result in step S1 is Yes, the pop-up display unit 29 obtains the input text 10 input to the input area 9 (S2).

Next, the pop-up display unit 29 determines whether a height of the pop-up is less than a length from the upper end of the input area 9 to the upper end of the display or not (S3).

When the determination result in step S3 is Yes, the pop-up display unit 29 displays a full-text pop-up above the input area 9 (S4).

When the determination result in step S3 is No, the pop-up display unit 29 displays the full-text pop-up below the input area 9 (S5).

When the determination result in step S1 is No, the pop-up display unit 29 does not display the pop-up 301 (S6) because all of the input text 10 is displayed.

The pop-up display unit 29 deletes the pop-up 301 when a certain period of time has elapsed from the pop-up display (S7, S8). During the input to the input area 9, the pop-up 301 is newly displayed or text is added to the pop-up 301 being displayed, every time the conversion of the hand drafted input data is determined.

Figure 22:
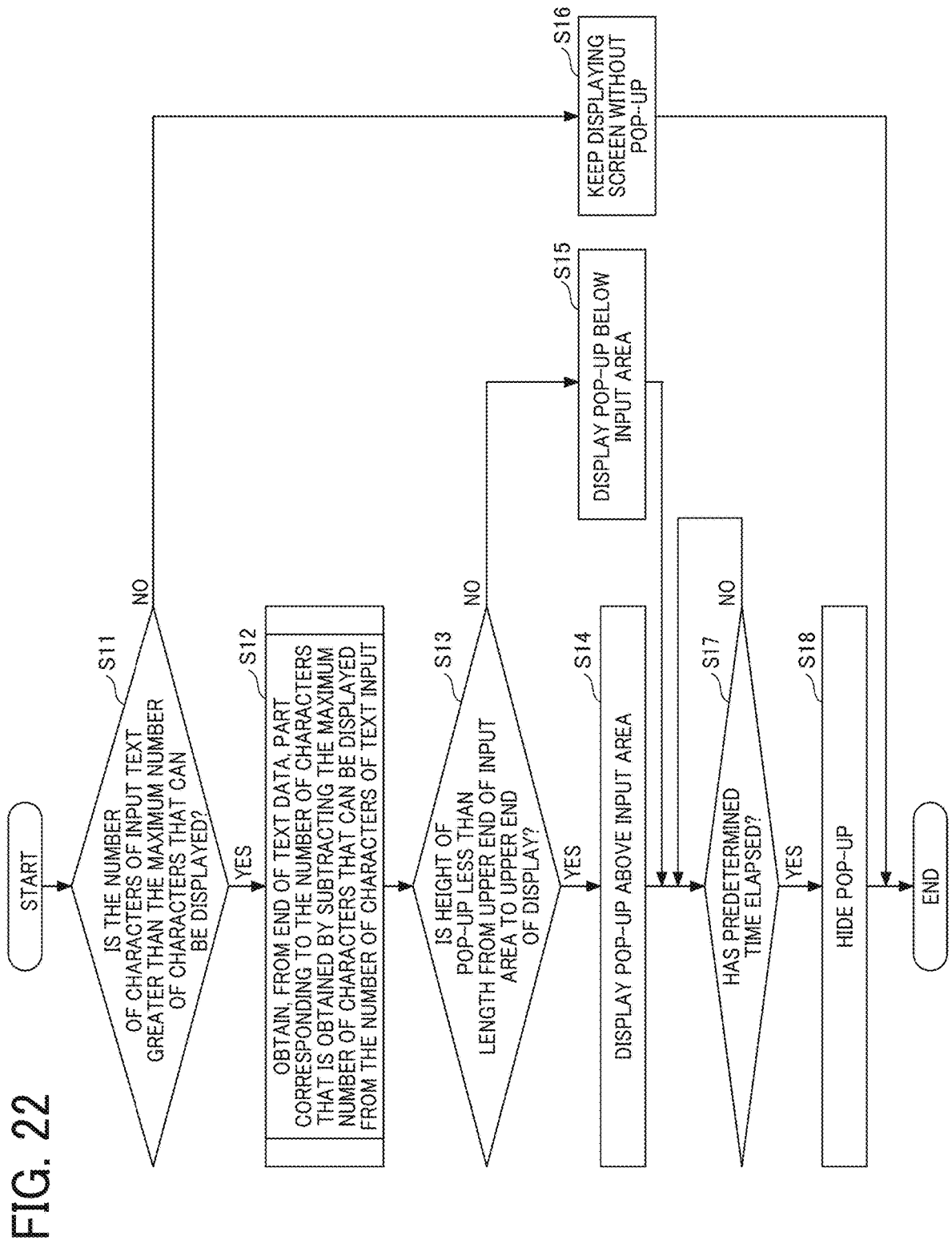
FIG. 22 is a flowchart illustrating an example of a process for displaying a pop-up, performed by the display apparatus, in a case of displaying the partial-text pop-up, according to the first embodiment of the disclosure.

FIG. 22 is a flowchart illustrating an example of a process for displaying a pop-up, performed by the display apparatus 2, in a case of displaying a partial-text pop-up. The process illustrated in FIG. 22 starts in response to, for example, a user operation of selecting text or accepting conversion using the operation guide 500.

The pop-up display unit 29 determines whether the number of characters of the input text 10 is greater than the maximum number of characters that can be displayed or not (S11).

When the determination result in step S11 is Yes, the pop-up display unit 29 obtains, from the end of the input text 10, a part corresponding to the number of characters that is obtained by subtracting the maximum number of characters that can be displayed from the number of characters of the input text 10 (S12).

Next, the pop-up display unit 29 determines whether the height of the pop-up is less than the length from the upper end of the input area 9 to the upper end of the display (S13).

When the determination result in step S13 is Yes, the pop-up display unit 29 displays a partial-text pop-up above the input area 9 (S14).

When the determination result in step S13 is No, the pop-up display unit 29 displays the partial-text pop-up below the input area 9 (S15).

When the determination result in step S11 is No, the pop-up display unit 29 does not display a pop-up (S16), namely, keeps displaying the screen without a pop-up, because all of the input text 10 is displayed.

The pop-up display unit 29 hides the pop-up 309 when a certain period of time has elapsed from a time of start of displaying the pop-up 309 (S17, S18).

Displaying Mark

Figure 23:
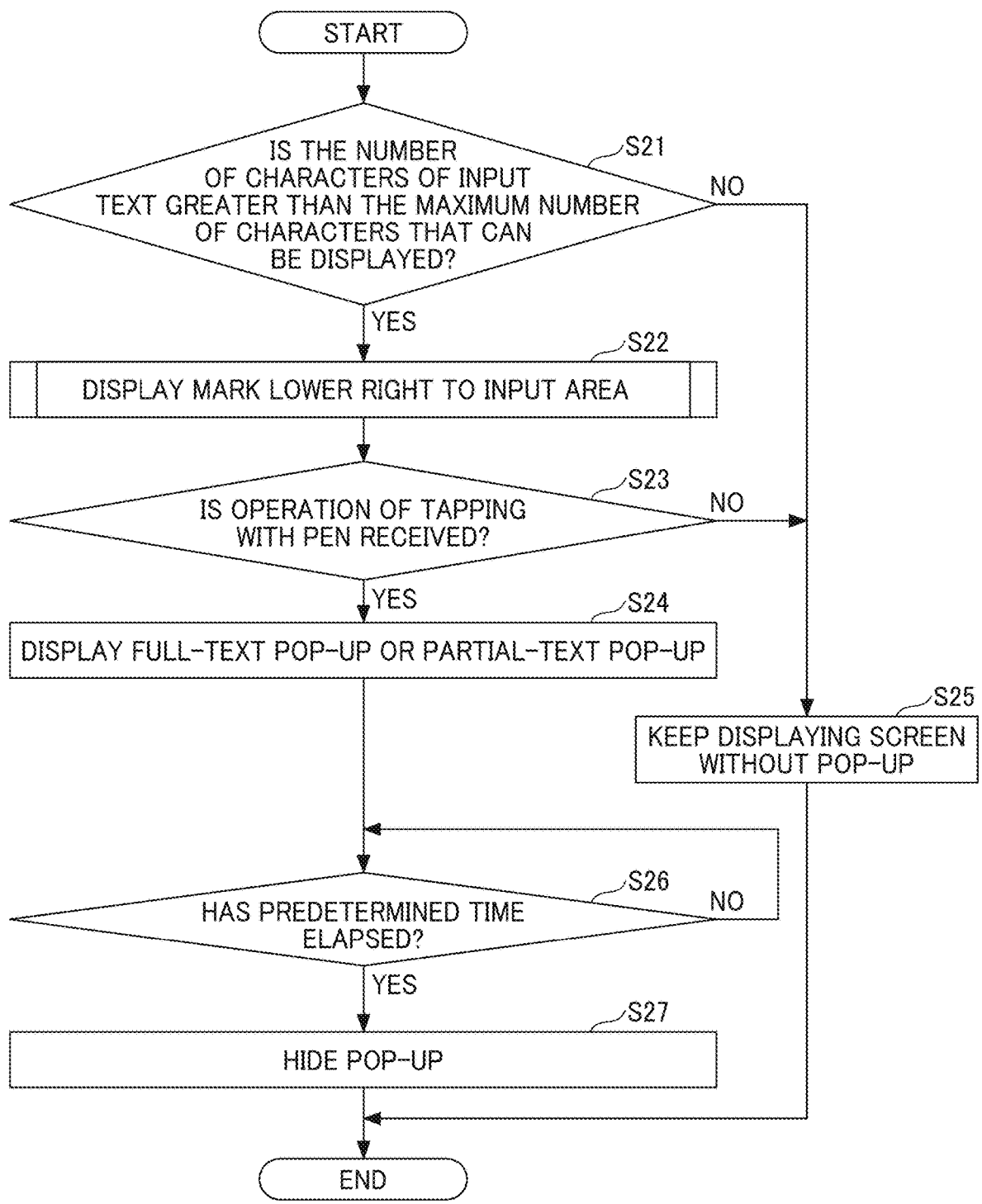
FIG. 23 is a flowchart illustrating an example of a process performed by the display apparatus for displaying a mark, according to the first embodiment of the disclosure.

FIG. 23 is a flowchart illustrating an example of a process performed by the display apparatus 2 for displaying the mark 302. The process illustrated in FIG. 23 starts in response to a text is selected from the operation guide 500 or conversion of the text is determined with the operation guide 500.

The mark display unit 30 determines whether the number of characters of the input text 10 is greater than the maximum number of characters that can be displayed or not (S21).

When the determination result in step S21 is Yes, the mark display unit 30 displays the mark 302 below the input area 9 (S22).

When the mark 302 is displayed, the operation receiving unit 27 determines whether the mark 302 is pressed by the pen 2500 or not (S23).

When the mark 302 is pressed by the pen 2500, the pop-up display unit 29 displays the input text 10 by a full-text pop-up or a partial-text pop-up (S24).

When the mark 302 is not pressed by the pen 2500, the pop-up display unit 29 does not display a pop-up for the input text 10 (S25).

The pop-up display unit 29 deletes the pop-up 301 when a certain period of time has elapsed from the start or the pop-up display (S26, S27).

As described above, since the display apparatus 2 according to the present embodiment displays the display components (the pop-up 301, the mark 302) related to the input text 10 of which a part is not displayed in the input area 9, even when the input text 10 of which a part is not displayed in the input area 9 is present, the user can read the input text 10 and can reduce erroneous recognition. Since the display apparatus 2 can display the pop-up 301 during the input of text, the user can continuously input the text while checking the input text 10.

Second Embodiment

In the following description of a second embodiment, a use example of the display apparatus 2 is given. The display apparatus 2 may be used at a site where handwriting on paper or an analog whiteboard is frequently performed. A case of generating and displaying a chronology about a disaster site that is an example of such a site where handwriting on paper or an analog whiteboard is frequently performed is described below.

When a major disaster or accident occurs, various kinds of enormous information such as medical needs, medical resources, and danger information are reported or transmitted to a head office, for example. As a method for managing such information, a method of recording in a timeline, called "chronology." is generated. Specifically, the head office or each team records occurred events, collected information, and information issued in a timeline by clearly describing "source of the information," "destination of the information," and "details of the information." Conventionally, chronologies are written by hand on, for example, an analog whiteboard, a writing sheet, or a large sheet of paper such as a poster.

The chronology is desired to be digitalized promptly. However, the record may not be accurate due to an error occurring in transcribing to digitalize, or a case that a part that is difficult to determine what is written is present. In addition, processing for digitalizing also arises.

A hand drafted input system such as the display apparatus 2 according to the present embodiment can generate and digitalize a chronology. The display apparatus 2 has a definition for an input rule for each input area 9, so that even a character written in a hurry by a user can be accurately converted into a text to automatically perform layout matching, and text data can be used in a subsequent workflow.

FIG. 24 is a diagram illustrating an example of a chronology that is generated by hand drafted input. In the case of hand drafted input, a board can be used flexibly, for example, characters can be fit in a frame by slightly reducing a size of the characters or reducing a space between characters, or the characters can be input to two lines if allowed. If an input rule is defined, characters can be quickly entered, but are not flexibly adjustable.

With a display apparatus according to a related art, when the number of characters exceeds the number of characters that is assumed in advance, a trouble such as failing to input by hand drafted input or display occurs. When data is completely input, content of the data can be confirmed by a computer, but the information is not confirmed with the chronology. In addition, a method of reducing in size in order to display all information can be used, but the visibility is deteriorated due to the reduction in the character size.

FIG. 25 is a diagram illustrating an example of display of a chronology with a display apparatus according to a related art. FIG. 26 is a diagram illustrating an example of display of a chronology to which pop-up display of the present embodiment is applied. The input text 10 having the number of characters that is greater than the maximum number of characters that can be displayed is input to five cells 330, 331, 332, 333, and 334 in the example of FIG. 25. However, from the example of FIG. 25, whether the input text 10 having the number of characters that is greater than the maximum number of characters that can be displayed is input or not is not recognizable.

Regarding this, in FIG. 26, the pop-up 309 is displayed for a cell, the cell 330, and marks 302 are displayed for two cells, the cell 331 and the cell 332. The user can view the full text of the input text 10 input to the cell 330. In the cell 331 and the cell 332, the user can notice that the input text 10 having the number of characters that is greater than the maximum number of characters that can be displayed is input (the input text 10 does not fit in the cell, and a part of the input text 10 is not displayed). When the user presses the mark 302 with the pen 2500, the entire text of the input text 10 can be viewed.

When the user desires to give priority to displaying an item that has the highest priority to be handled or that is currently handled, the pop-up can be kept being displayed even after the pen 2500 is separated from the board, according to an operation such as holding down. When another operation (for example, an operation of holding down) is detected, the display apparatus 2 hides the pop-up and displays the mark 302 again. In addition, the display apparatus 2 may hide the pop-up after a certain period of time has elapsed.

In addition, in defining an input rule by the user, when there is no problem even if text input to a cell is displayed with the cell and an adjacent cell (for example, when the number of characters that exceeds the maximum number of characters fit in the cell is equal to or less than a certain number or when the adjacent cell is blank), the user may set that the display apparatus 2 displays the text crossing the cell and the adjacent cell without displaying a pop-up (text 381 and text 382 in FIG. 26).

For example, when content does not fit in a first cell, a display component (pop-up) is displayed in a second cell that is different from the first cell in a table. By doing so, a display component is displayed in a cell that is adjacent to another cell to which hand drafted input is performed. Accordingly, even when the content that is input by hand drafted input does not fit in the first cell and a part of the content is not displayed, a pop-up is displayed in a neighboring cell, and this allows the user to easily view the content, which is originally input by hand drafted input.

Third Embodiment

In the following description of a third embodiment, a use example of the display apparatus 2 is given. The display apparatus 2 may be used at a site where handwriting on paper or an analog whiteboard is frequently performed. A case of sharing information on triage at a disaster site that is an example of such a site where handwriting on paper or an analog whiteboard is frequently performed is described below. Triage means that when a large number of patients come out at the same time due to, for example, a major accident or a disaster, medical personnel give priority according to a degree of urgency of care.

Figure 27:
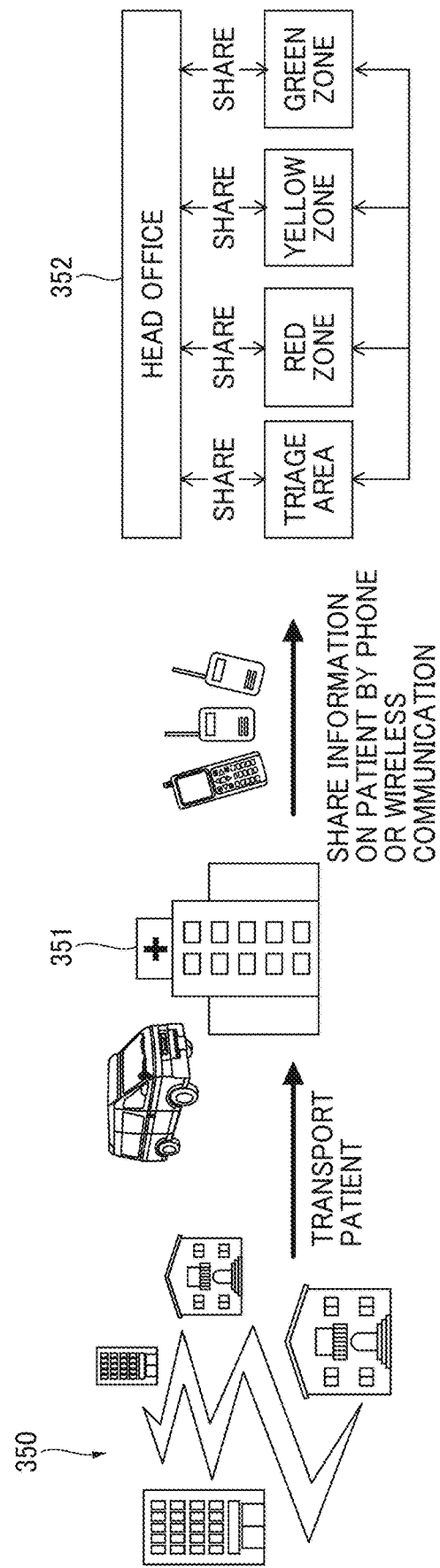
FIG. 27 is a diagram illustrating an example of sharing triage information at a disaster site according to a third embodiment of the disclosure.

FIG. 27 is a diagram illustrating sharing information on triage at a disaster site. The triage is performed in relation to patients at a disaster site 350 or at a hospital 351 to which the patients are transported. A head office 352 is set in order to deal with disaster or take care of patients rapidly and accurately. Conventionally, an analog whiteboard or the like is prepared in the head office 352, and a situation is appropriately written therein, for example. Regarding triage, information on each patient is written in the analog whiteboard, and rewriting also frequently occurs. Accordingly, a digitized device such as the display apparatus 2 is desired in alternative to the analog whiteboard.

FIG. 28 is a diagram illustrating an example of a triage table displayed by the display apparatus 2. The display apparatus 2 can communicate with another display apparatus 2 at another base via a network. In FIG. 28, (a) is a diagram illustrating a triage table 354A displayed by the display apparatus 2 provided in the hospital, and (b) is a diagram illustrating a triage table 354B displayed by the display apparatus 2 provided in the head office.

The display apparatus 2 displays the triage tables 354A and 354B prepared in advance in a portable document format (PDF) file, for example. In FIG. 28, items of "No, age, gender, name, disease/injury name, treatment/situation, secondary triage, outcome, correspondence from head office" are displayed. The display apparatus 2 converts the hand drafted input data into text, and this reduces misunderstanding that may occur when the hand drafted input data being displayed is not organized well.

Input area information similar to that of the input area information storage unit 41 may be set to the column of the input area 9 corresponding to each item. Accordingly, the conversion dictionary is determined for the input area 9, and for example, numbers are displayed in the item of age and "male or female" is displayed in the item of gender. In this case, since the conversion accuracy is high, the operation guide 500 is not displayed depending on the item, and efficient input is possible.

The display apparatuses 2 can share the input text 10 with each other in real time. Accordingly, an object such as an age input in the hospital is shared with the head office, and a message from the head office input by hand drafted input by a person in charge of the head office can be displayed on the display apparatus 2 in the hospital.

Such communication between the hospital and the head office is performed by text data rather than voice such as telephone, and the display apparatuses 2 of the hospital and the head office display the data in real time, so that quick and accurate response is possible.

Sharing Triage Information between Site and Head Office

Figure 29:
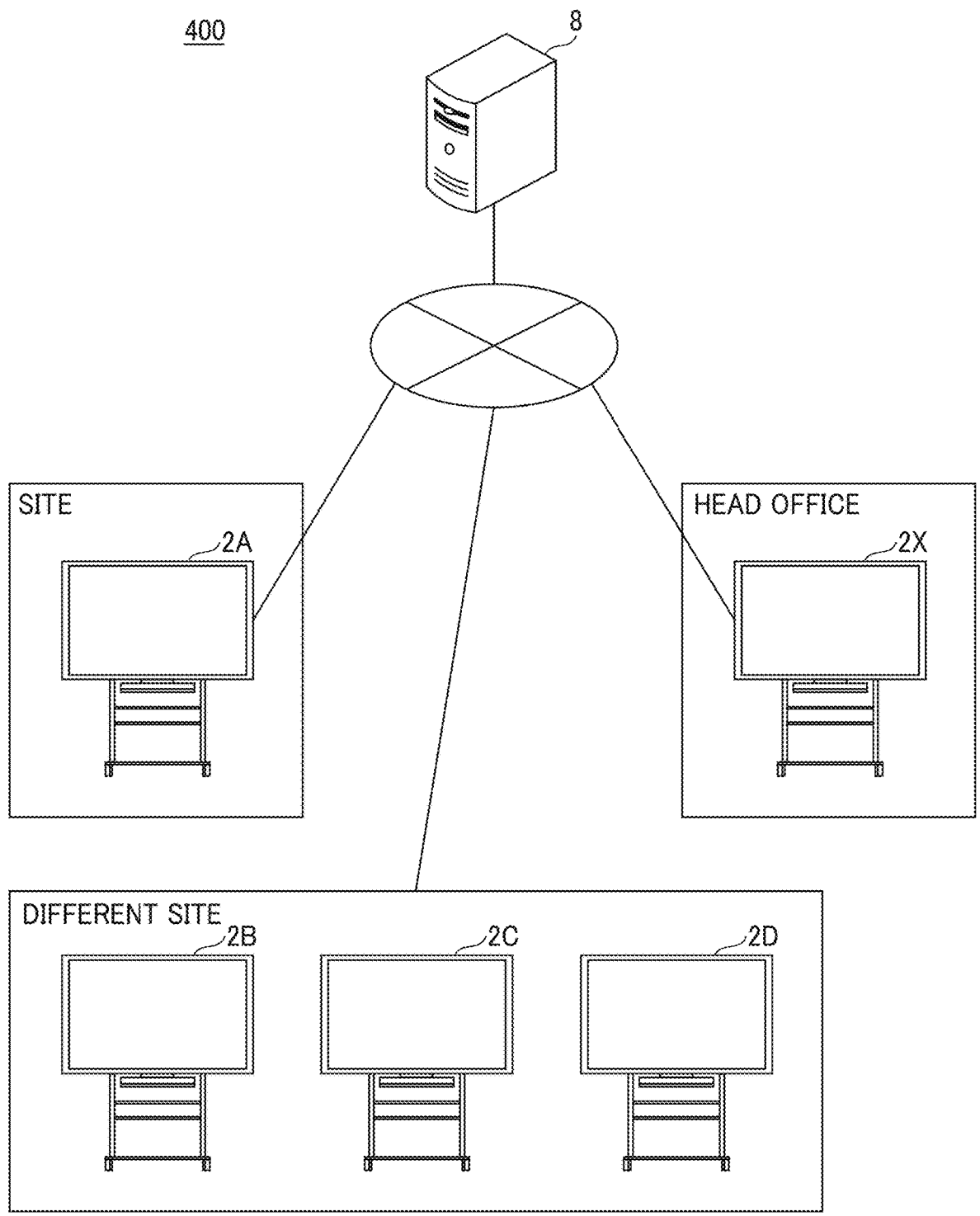
FIG. 29 is a diagram illustrating an example of a system configuration of an information sharing system according to the third embodiment of the disclosure.

FIG. 29 is a diagram illustrating an example of a system configuration of an information sharing system 400. The information sharing system 400 includes a display apparatus 2A at a site and a display apparatus 2X at a head office, and may further include an information management server 8. The display apparatus 2A and the display apparatus 2X are connected to communicate with each other via a wide area network such as the Internet.

The display apparatus 2A and the display apparatus 2X connect to the same session (which can be said to be a meeting related to the same disaster) by connecting to the uniform resource locator (URL) issued by the information management server 8. The information management server 8 shares the display data such as hand drafted input data with the plurality of display apparatuses 2 connected to the same session.

Data transmission and reception may be performed between the display apparatuses 2A and 2X using a communication method such as web real time communication (WebRTC) without the information management server 8.

Other display apparatuses 2B to 2D at one or more different sites may also be connected to the head office, and the display apparatus 2X at the head office can share triage information with the display apparatuses 2B to 2D at a plurality of sites in parallel.

Figure 30:
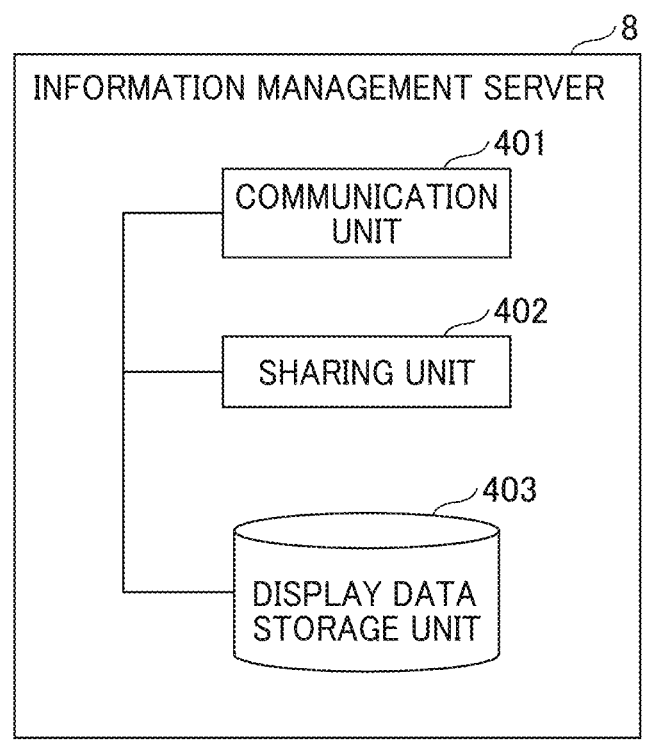
FIG. 30 is a block diagram illustrating an example of a functional configuration of an information management server according to the third embodiment of the disclosure.

FIG. 30 is a block diagram illustrating an example of a functional configuration of the information management server 8. The hardware configuration of the information management server 8 may be substantially the same as that of a general purpose computer. The information management server 8 includes a communication unit 401, a sharing unit 402, and a display data storage unit 403. The communication unit 401 communicates with the display apparatuses 2A to 2D at the one or more sites, and transmits metadata and display data, which are described later, from one display apparatus 2 to other display apparatuses 2.

The sharing unit 402 manages the display apparatuses 2 connected to the same session and performs a process of sharing the metadata and the display data between the display apparatuses 2 connected to the same session.

The display data storage unit 403 stores the display data such as hand drafted input data and text together with position information on a position on the display 220. The display data is associated with a session ID. The session ID is identification information identifying a session in which the display data is shared.

Figure 31:
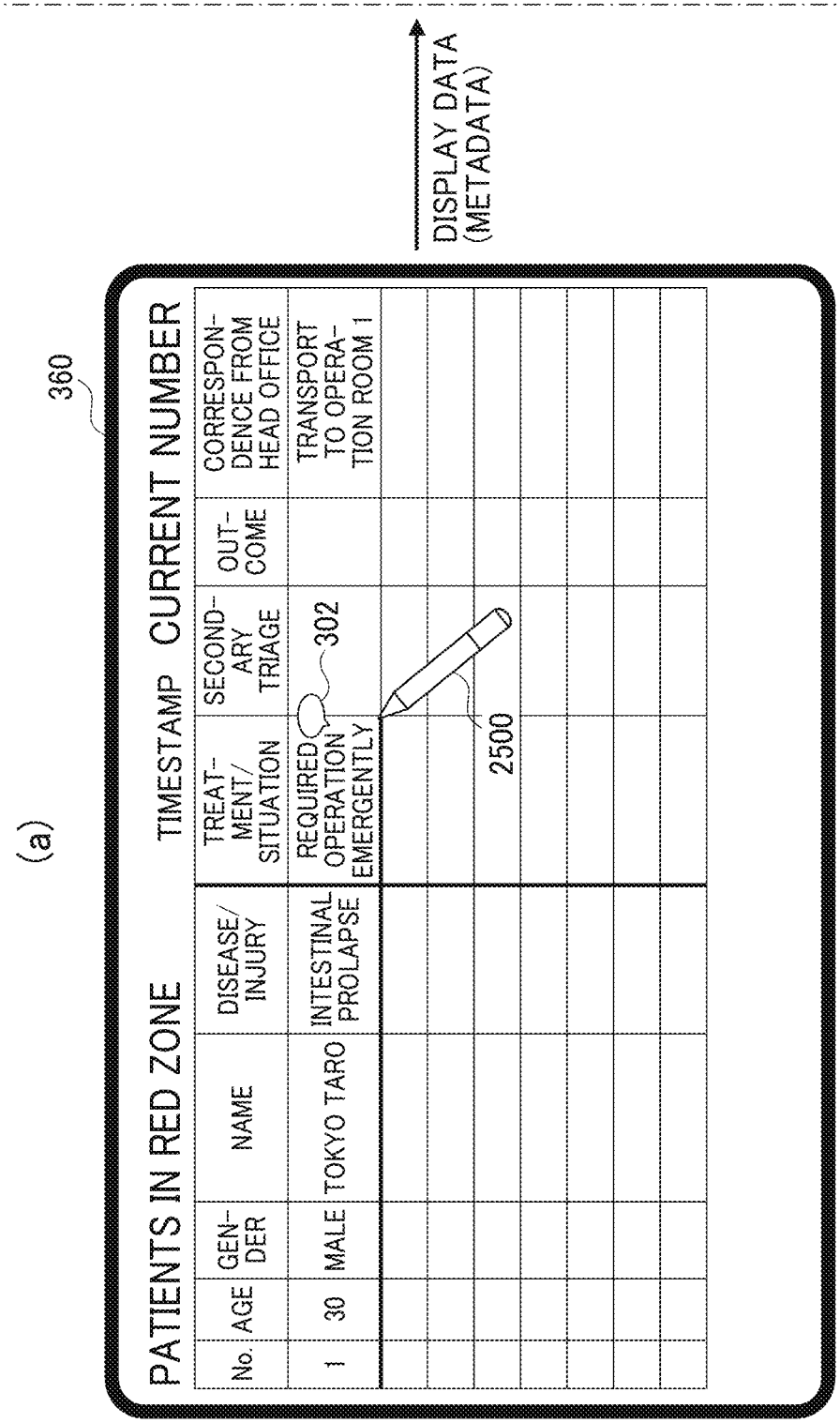
FIGS. 31A to 31C are diagrams illustrating an example of chronology displayed by the display apparatus at a site and chronology displayed by the display apparatus at a head office, according to the third embodiment of the disclosure.

A process performed by the display apparatuses 2 at the one or more sites and the head office for sharing a chronology is described with reference to FIGS. 31 (31A to 31C) and 32. FIGS. 31A to 31C are diagrams illustrating an example of chronology displayed by the display apparatus 2A at the site and chronology displayed by the display apparatus 2X at the head office. The chronology is information arranged in time series. FIG. 31A is a diagram illustrating an example of a chronology of triage information 360 displayed by the display apparatus 2 at the site, and FIGS. 31B and 31C are a diagram illustrating an example of chronologies of triage information 361 to 364 displayed by the display apparatus 2X at the head office.

As an example, display apparatuses 2A and 2X share triage information between a plurality of locations (locations A, B, C, and D) in the site and the head office (location X). When a user at one location (location A) among the plurality of locations at the site inputs information on injured patients in the display apparatus 2A by hand drafted input, a pop-up or the like is also displayed in the input area 9 of the display apparatus 2A. The input text 10 is transmitted from the display apparatus 2A to the display apparatus 2X of the head office, and displayed by the display apparatuses 2A and 2X of the head office. Accordingly, the head office can quickly grasp information and issue a countermeasure instruction.

The input text 10 is also transmitted from the other locations (locations B, C, and D) to the display apparatus 2X of the head office in parallel. The other locations (locations B, C, and D) are disaster sites different from the site A. The display apparatus 2X displays a screen including information corresponding to the plurality of locations. In this case, the display apparatus 2X of the head office displays four pieces of triage information 361 to 364. Among them, the triage information 361 is the triage information 360 displayed by the display apparatus 2A. In other words, the display apparatus 2X of the head office communicates with the display apparatuses 2 of four different sites, and divides the display into four parts. The user of the display apparatus 2X at the head office can edit the display data sent from the display apparatus 2A at the site.

When the four pieces of triage information 361 to 364 are simultaneously displayed on the display apparatus 2X of the head office, an image of the screen is reduced and displayed. In the head office, the content input on the screen is not easily viewed.

Accordingly, the display apparatus 2X in the head office can change the display data sent from terminals at disaster sites. To be more specific, the display apparatus 2X at the head office displays the mark 302 and various buttons in the display data sent from the display apparatus 2A at the site. The display apparatus 2X displays a hidden portion by receiving selection of the mark 302 or the button.

The display apparatus 2X of the head office displays the mark 302, an enlargement button 371, and an edit button 372 according to the present embodiment. For example, when the enlargement button 371 is selected, the display apparatus 2X enlarges display data, which is divided in four, to be displayed. When the display apparatus 2 of the head office receives the edit button 372 for editing a frame, the user can edit a frame and a ruled line. When the display apparatus 2X of the head office that receives the editing moves and edits a frame or a ruled line of the triage information to display content, which is currently hidden and indicated by a pop-up, within the frame.

The metadata such as operation content received by the display apparatus 2X is transmitted to and stored in the information management server 8. The user in the head office can enlarge and display or edit the content of the display information transmitted from the display apparatus 2A, and the user in the head office can more surely grasp the content transmitted from the display apparatus 2A.

By transmitting the metadata relating to an operation for a chart, a table, or hand drafted content along with the display data from the display apparatus 2A to the display apparatus 2X of the head office, the display content can be changed in the display apparatus 2X of the head office.

Figure 32:
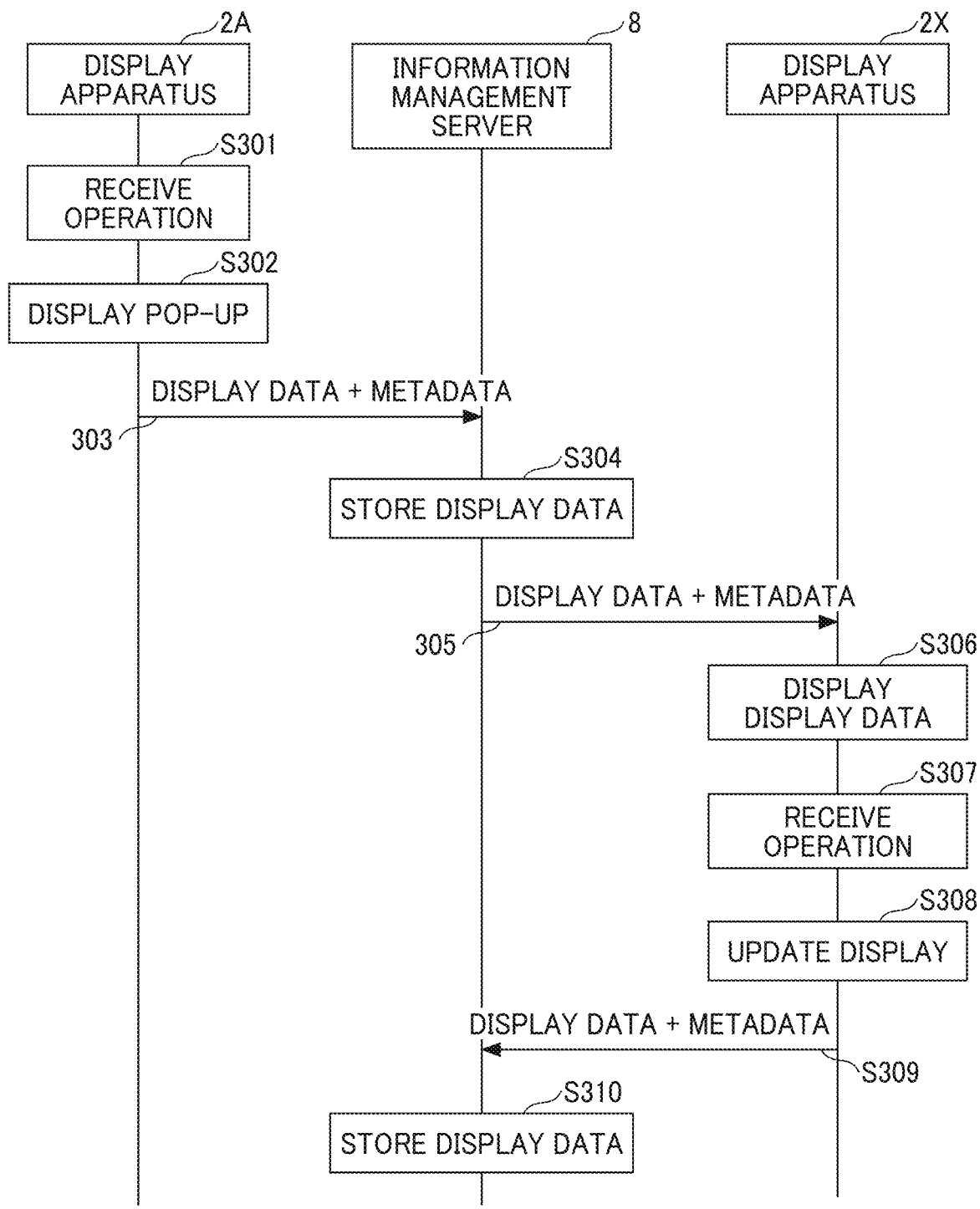
FIG. 32 is a sequence diagram illustrating an example of a process performed by the display apparatus at the site and the display apparatus at the head office for sharing display data and metadata, according to the third embodiment of the disclosure.

FIG. 32 is a sequence diagram illustrating an example of a process performed by the display apparatus 2A at the site and the display apparatus 2X at the head office for sharing display data and metadata.

S301, S302: The input receiving unit 21 of the display apparatus 2A receives an input of hand drafted input data. When the input text 10 having characters of which the number is greater than the maximum number of characters that can be displayed is input, the pop-up display unit 29 displays a pop-up. For example, metadata indicating that the pop-up is displayed is input.

S303: The network communication unit 26 of the display apparatus 2A transmits the display data and the metadata to the information management server 8.

S304: The communication unit 401 of the information management server 8 receives the display data and the metadata, and the sharing unit 402 stores the display data and the metadata in the display data storage unit 403.

S305: The information management server 8 transmits the display data and the metadata to the display apparatus 2X at the location X. The display apparatus 2A at the location A and the display apparatus 2X at the head office are connected to the same session.

S306: The network communication unit 26 of the display apparatus 2X receives the display data and the metadata, and the display control unit 24 displays the display data. The pop-up display unit 29 displays a pop-up according to the metadata.

S307, S308: The input receiving unit 21 of the display apparatus 2X receives an input of hand drafted input data. The display control unit 24 updates the screen. For example, the user of the display apparatus 2X enlarges the triage information or edits a frame of the enlarged triage information.

S309: The network communication unit 26 of the display apparatus 2X transmits the display data and the metadata (frame editing) to the information management server 8.

S310: The communication unit 401 of the information management server 8 receives the display data and the metadata, and the sharing unit 402 stores the display data and the metadata in the display data storage unit 403. The information management server 8 may store the display data or content and display change content that are received by the display apparatus 2X of the head office, and transmit the content and the display change content, which are received by the display apparatus 2X of the head office, to the terminals (terminals A, B, C, and D) at the disaster site to update the display content.

According to the present embodiment, rewriting that occurs frequently with paper or an analog whiteboard can be preferably replaced. The display apparatus 2 converts the hand drafted input data into text, and this reduces misunderstanding that may occur when the hand drafted input data being displayed is not organized well. Since communication between the site and the head office is performed by text data, but not by voice of telephone, and the display apparatuses 2 displays screens interactively in real time, quick and accurate correspondence can be achieved.

Fourth Embodiment

The display apparatus 2 can perform processing in a stand-alone type, but can also be applied to a server-client system.

Application to Server Client System

Figure 33:
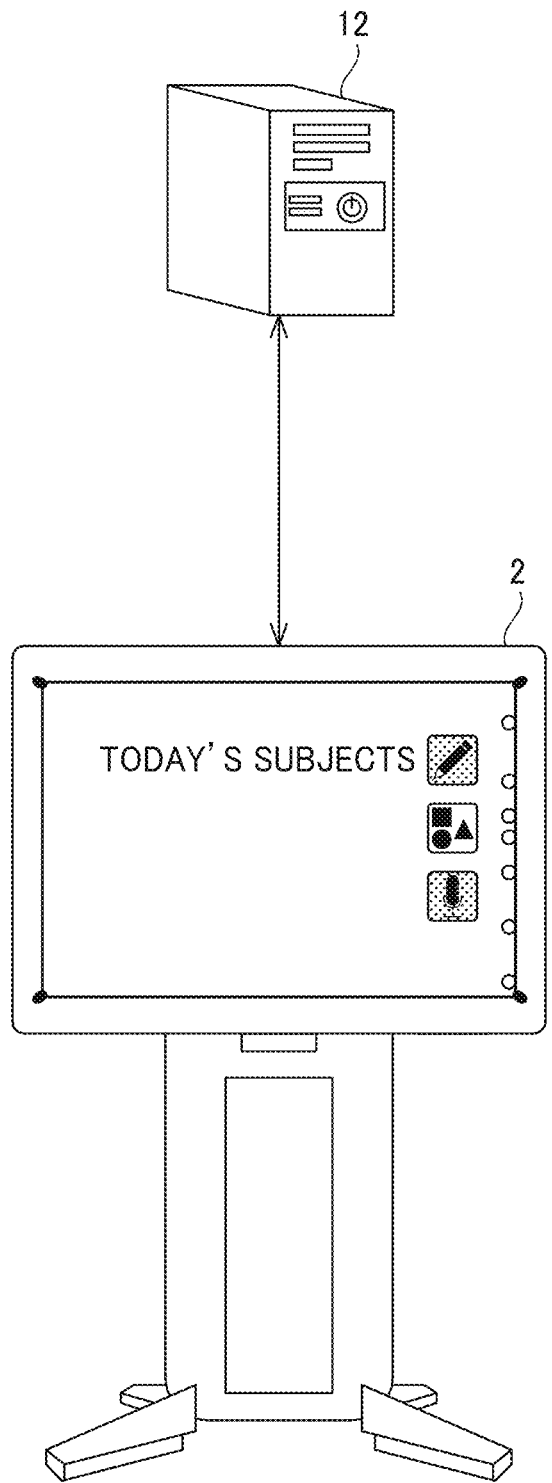
FIG. 33 is a diagram illustrating an example of a configuration of a display system according to a fourth embodiment of the disclosure.

FIG. 33 is a diagram illustrating an example of a schematic configuration of a display system 19. The function of the display apparatus 2 can also be implemented in a server-client system as illustrated in FIG. 33. The display apparatus 2 and a server apparatus 12 are connected to each other through a network such as the Internet.

In the display system 19, the display apparatus 2 includes the input receiving unit 21, the drawing data generation unit 22, the display control unit 24, the network communication unit 26, and the operation receiving unit 27, the input content display unit 28, the pop-up display unit 29, and the mark display unit 30 illustrated in FIG. 4.

The server apparatus 12 includes the conversion unit 23, the data recording unit 25, and the network communication unit 26. The server apparatus 12 may include the input content display unit 28, the pop-up display unit 29, and the mark display unit 30, and may transmit screen data to be displayed on the display such as a pop-up to the display apparatus 2.

The network communication unit 26 of the display apparatus 2 transmits stroke data to the server apparatus 12. The server apparatus 12 transmits the result of recognition performed on the hand drafted input data to the display apparatus 2.

As described above, in the display system 19, the display apparatus 2 and the server apparatus 12 interactively display text data. In addition, since the object data is stored in the server apparatus 12, the display apparatus 2 or a PC provided in a remote site can connect to the server apparatus 12 and share the object data in real time.

As described above, in addition to the effects of the first and second embodiments, the display apparatus 2 according to the present embodiment can achieve the same effect in the server-client system.

Variation

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, although a case that text is input by hand drafted input horizontally has been described in the above-described embodiments, text may also be input by hand drafted input vertically when the input area is vertically long.

Although the display apparatus 2 of the present embodiment performs the pop-up display when the input text 10 is greater than the maximum number of characters that can be displayed, the display apparatus 2 may start the pop-up display when the input text 10 is less than or equal to the maximum number of characters that can be displayed.

In the description of the above-described embodiments, the electronic whiteboard is used as an example to be described but is not limited thereto. The electronic whiteboard may be referred to as, for example, an electronic information board. The present disclosure is applicable to any information processing apparatus having a touch panel. Examples of the information processing apparatus with a touch panel include, but not limited to, a projector (PJ), a data output device such as a digital signage, a head up display (HUD), an industrial machine, an imaging device such as a digital camera, a sound collecting device, a medical device, a network home appliance, a notebook PC, a mobile phone, a smartphone, a tablet terminal, a game machine, a personal digital assistant (PDA), a wearable PC, and a desktop PC.

Further, in the embodiments described above, the display apparatus 2 detects the coordinates of the pen tip of the pen with the touch panel. However, the display apparatus 2 may detect the coordinates of the pen tip using ultrasonic waves. Further, the pen transmits an ultrasonic wave together with light emission, and the display apparatus 2 calculates a distance based on an arrival time of the ultrasonic wave. The display apparatus 2 determines the position of the pen based on the direction and the distance, and a projector draws (projects) the trajectory of the pen based on stroke data.

In the block diagram such as FIG. 4, functional units are divided into blocks in accordance with main functions of the display apparatus 2, in order to facilitate understanding the operation by the display apparatus 2. No limitation to a scope of the present disclosure is intended by how the processes are divided or by the name of the processes. The processing implemented by the display apparatus 2 may be divided into a larger number of processing units depending on the content of the processing. Also, one processing unit can be divided so as to include more processing units.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Embodiments of the present disclosure can provide significant improvements in computer capability and functionality. These improvements allow users to take advantage of computers that provide more efficient and robust interaction with tables that is a way to store and present information on information processing apparatuses. In addition, embodiments of the present disclosure can provide a better user experience through the use of a more efficient, powerful, and robust user interface. Such a user interface provides a better interaction between humans and machines.

An embodiment of the present disclosure includes a non-transitory recording medium storing a plurality of instructions which, when executed by one or more processors, causes the processors to perform a method. The method includes receiving an input of hand drafted input data. The hand drafted input data is input to an input area. The method includes displaying an object corresponding to the hand drafted input data in the input area. The method includes displaying, in response to a part of the object failing to be displayed within the input area, a display component in which at least the part of the object is displayed.

However, in a related art, a size of the hand drafted input content is reduced to display the reduced hand drafted input content by a user operation performed on a reduction button, and this takes time and effort of the user.

According to an embodiment of the disclosure, a display apparatus that displays without taking time and effort of a user is provided.

The invention claimed is:

1. A display apparatus, comprising circuitry configured to:
receive an input of hand drafted input data, the hand drafted input data being input to an input area being displayed;
display, in the input area, an object corresponding to the hand drafted input data; and
display, based on a part of the object failing to be displayed within the input area, a display component related to an additional object representing at least the part of the object.

2. The display apparatus of claim 1, wherein
the input area is set to display a limited amount of the object, and
the circuitry is further configured to display the display component related to the additional object, based on an amount of the object exceeding the limited amount to be displayed within the input area.

3. The display apparatus of claim 2, wherein
the display component is a mark indicating that the amount of the object exceeds the limited amount.

4. The display apparatus of claim 3, wherein
the circuitry is further configured to display, in response to receiving an operation performed on the mark, a pop-up with which an entire object is displayed.

5. The display apparatus of claim 3, wherein
the circuitry is further configured to display, in response to receiving an operation performed on the mark, a pop-up with which the part of the object is displayed.

6. The display apparatus of claim 1, wherein
the display component is a pop-up with which an entire object is displayed.

7. The display apparatus of claim 6, wherein
the circuitry is further configured to determine a position at which the display component is to be displayed, based on a relationship between a distance between an upper end of the input area and an end of a display and a height of the pop-up.

8. The display apparatus of claim 6, wherein
the circuitry is further configured to update the pop-up each time additional hand drafted input data is input to the input area, based on the additional hand drafted data.

9. The display apparatus of claim 1, wherein
the display component is a pop-up with which the part of the object is displayed.

10. The display apparatus of claim 1, wherein
the circuitry is further configured to;
convert the hand drafted input data into a plurality of texts;
display the plurality of texts;
receive selection of one of the plurality of texts; and
display, in response to the selection of the one of the plurality of texts, the at least the part of the object in the display component.

11. The display apparatus of claim 1, wherein
the circuitry is further configured to convert the hand drafted input data into a text; and
display, in response to converting the hand drafted input data into the text, the at least the part of the object in the display component.

12. The display apparatus of claim 1, wherein,
in response to receiving an input of additional hand drafted input data for generating a blank space in the input area, the circuitry is further configured to
delete, in the input area, a different part of the object from a head of the object, and
display, in the input area, a remaining of the object in a left-aligned manner, the different part of the object being determined based on a length of a stroke represented by the additional hand drafted input data.

13. The display apparatus of claim 1, wherein,
the hand drafted input data includes first hand drafted input data and second hand drafted input data, and
in response to receiving an input of the second hand drafted input data corresponding to the part of the object to an adjacent input area within a certain period of time from another input of the first hand drafted input data to the input area,
the circuitry is further configured to
restrict displaying in the adjacent input area, and
receive the second hand drafted input data as being input to the input area, the adjacent input area being adjacent to the input area.

14. The display apparatus of claim 1, wherein
the circuitry is further configured to display the at least the part of the object in the display component in response to the input of the hand drafted input data to the input area.

15. The display apparatus of claim 1, wherein
the input area is a first cell in a table displayed on a screen, and
the circuitry is further configured to
display the object corresponding to the hand drafted input data in the first cell, and
display, based on the part of the object failing to be displayed in the first cell, the at least the part of the object in the display component, the display component being in a second cell, the second cell being a cell in the table and different from the first cell.

16. A display method, comprising:
receiving an input of hand drafted input data, the hand drafted input data being input to an input area being displayed,
displaying, in the input area, an object corresponding to the hand drafted input data; and
displaying, based on a part of the object failing to be displayed within the input area, a display component in which at least the part of the object is displayed.

17. An information sharing system, comprising:
a first display apparatus including first circuitry; and
a second display apparatus including second circuitry, the second display apparatus being connected to the first display apparatus via a network to communicate and to share information with the first display apparatus, and
each of the first circuitry and the second circuitry being configured to
receive an input of hand drafted input data, the hand drafted input data being input to an input area displayed on a corresponding one of a first display of the first display apparatus and a second display of the second display apparatus, and
display, on the corresponding one of the first display and the second display, an object corresponding to the hand drafted input data in the input area,
wherein in a case that a part of the object fails to be displayed in the input area, a corresponding one of the first circuitry and the second circuitry displays, on the corresponding one of the first display and the second display, a display component in which an additional object representing at least the part of the object is displayed, and
wherein, in a case that the first circuitry displays the additional object in the display component on the first display,
the second circuitry is further configured to display, on the second display, the additional object in the display component, in response to receiving an indication that the first circuitry displays the additional object in the display component on the first display, the indication being received from the first display apparatus.

* * * * *